United States Patent
Heppe

(10) Patent No.: US 9,623,949 B2
(45) Date of Patent: Apr. 18, 2017

(54) SYSTEMS AND METHODS FOR LONG ENDURANCE AIRSHIP OPERATIONS

(75) Inventor: Stephen Heppe, Hood River, OR (US)

(73) Assignee: STRATOSPHERIC AIRSHIPS, LLC, Hood River, OR (US)

( * ) Notice: Subject to any disclaimer, the term of this patent is extended or adjusted under 35 U.S.C. 154(b) by 802 days.

(21) Appl. No.: 13/048,625

(22) Filed: Mar. 15, 2011

(65) Prior Publication Data

US 2012/0234964 A1    Sep. 20, 2012

(51) Int. Cl.
*B64B 1/00* (2006.01)
*B64C 37/02* (2006.01)

(52) U.S. Cl.
CPC ............ *B64B 1/00* (2013.01); *B64C 37/02* (2013.01); *B64C 2201/022* (2013.01); *B64C 2201/06* (2013.01)

(58) Field of Classification Search
CPC ..... B64B 1/00; B64C 37/02; B64C 2201/022; B64C 2201/06
USPC .................................................. 244/2, 3, 30
See application file for complete search history.

(56) References Cited

U.S. PATENT DOCUMENTS

| 213,603 | A |   | 3/1879 | Apraxine |
|---|---|---|---|---|
| 1,549,061 | A |   | 5/1923 | Chenu |
| 1,372,924 | A |   | 3/1929 | Anderson |
| 1,818,138 | A | * | 8/1931 | Howland ............ 244/3 |
| 2,365,778 | A |   | 12/1944 | Schwab |
| 2,471,599 | A |   | 5/1949 | Young |
| 2,475,839 | A |   | 7/1949 | Jalbert |
| 2,863,618 | A |   | 12/1958 | Doyle et al. |
| 3,260,480 | A |   | 7/1966 | Ash et al. |
| 3,279,419 | A |   | 10/1966 | Demarco |
| 3,412,958 | A |   | 11/1968 | Struble, Jr. |
| 3,424,405 | A |   | 1/1969 | Struble, Jr. |
| 3,605,329 | A |   | 9/1971 | dalli |
| 3,834,655 | A |   | 9/1974 | Crosby, Jr. |
| 4,082,063 | A |   | 4/1978 | Strickland |
| 4,365,772 | A |   | 12/1982 | Ferguson |

(Continued)

FOREIGN PATENT DOCUMENTS

| GB | 2141088 A | 12/1984 |
|---|---|---|
| WO | 2005081680 A2 | 9/2005 |
| WO | 2012125639 A1 | 9/2012 |

OTHER PUBLICATIONS

U.S. Appl. No. 11/698,969, filed Jan. 26, 2007 entitled: "Modular airship system and method " published as US20080179453.

(Continued)

*Primary Examiner* — Valentina Xavier
(74) *Attorney, Agent, or Firm* — Fabian VanCott; Jeffrey Riddle

(57) ABSTRACT

In one example, a long endurance airship system includes a first combined airship with a payload airship and a first logistics airship. The first combined airship is configured for stationkeeping at a predetermined station during meteorological conditions with wind speeds below a predetermined threshold. The airship system also includes a second combined airship which is a reconfiguration of the first combined airship and includes the payload airship and a second logistics airship. The second combined airship is configured for stationkeeping at the predetermined station in all meteorological conditions, including meteorological conditions with wind speeds above the predetermined threshold.

12 Claims, 11 Drawing Sheets

(56) References Cited

U.S. PATENT DOCUMENTS

| | | | |
|---|---|---|---|
| 4,476,576 | A | 10/1984 | Wheeler et al. |
| 4,601,444 | A | 7/1986 | Lindenbaum |
| 4,695,012 | A | 9/1987 | Lindenbaum |
| 4,995,572 | A * | 2/1991 | Piasecki .......................... 244/2 |
| 5,090,637 | A | 2/1992 | Haunschild |
| 5,857,645 | A | 1/1999 | Hodgson |
| 6,010,093 | A | 1/2000 | Paulson |
| 6,142,414 | A | 11/2000 | Doolittle |
| 6,220,543 | B1 | 4/2001 | Uskolovsky |
| 6,224,015 | B1 | 5/2001 | Reinhard |
| 6,325,330 | B1 | 12/2001 | Lavan, Jr. |
| 6,422,506 | B1 | 7/2002 | Colby |
| 6,648,235 | B2 | 11/2003 | Chan |
| 6,843,448 | B2 | 1/2005 | Parmley |
| 7,046,934 | B2 | 5/2006 | Badesha et al. |
| 7,055,777 | B2 * | 6/2006 | Colting ........................... 244/30 |
| 7,708,222 | B2 | 5/2010 | Lee |
| 8,061,648 | B2 | 11/2011 | Lachenmeier |
| 2004/0195431 | A1 | 10/2004 | Yumlu et al. |
| 2006/0000945 | A1 | 1/2006 | Voss |
| 2008/0087762 | A1 | 4/2008 | Holloman et al. |
| 2008/0179453 | A1 | 7/2008 | Thompson |
| 2008/0265086 | A1 | 10/2008 | Lee |
| 2009/0152391 | A1 * | 6/2009 | McWhirk ....................... 244/30 |
| 2012/0234964 | A1 | 9/2012 | Heppe |
| 2012/0234965 | A1 | 9/2012 | Heppe |
| 2012/0312918 | A1 | 12/2012 | Heppe |
| 2012/0312919 | A1 | 12/2012 | Heppe |
| 2013/0037650 | A1 | 2/2013 | Heppe |

OTHER PUBLICATIONS

Naval Research Advisory Committe, Lighter-Than-Air Systems for Future Naval Missions, Flag Officers and Senior Executive Service, The Pentagon Auditorium, Oct. 4, 2005.
Sanswire Corporation, Unmanned Airship Solutions for Integrated ISR Systems; Technical White Paper, Jul. 24, 2007.
Graham Warwick, Higher ground: Stratospheric airships special report—Aug. 15, 2006—Washington DC—Flight International.
Craig L. Nickol et al., High Altitude Long Endurance UAV Analysis of Alternatives and Technology Requirements Development, NASA/TP-2007-214861.
George D. Modica et al., An Investigation of Stratospheric Winds in Support of the High Altitude Airship, Atmospheric and Environmental Research, Inc., Lexington, Massachusetts Systems Technology, Inc., Hawthorne, California.
JP Aerospace, Something new at the boundary of Earth and space; Tandem Class Airships, http://www.jpaerospace.com/Tandem/tandem.html[Nov. 20, 2010 4:50:26 PM].
MITRE, 12 Miles High; An Integrated Airship—Radar is on the Horizon, Mar. 2010.

* cited by examiner

US 9,623,949 B2

SYSTEMS AND METHODS FOR LONG ENDURANCE AIRSHIP OPERATIONS

BACKGROUND

There is a recognized need for long endurance aeronautical operations that can, for example, provide persistent surveillance, maintain a communication link, or make in situ science measurements over an extended period of time comprising weeks, months or even years. However, current aircraft have limited endurance. Consequently, a long endurance aeronautical operation typically involves cycling through multiple aircraft. Specifically, while one or more aircraft is/are performing the intended mission, one or more other aircraft is/are being refueled and possibly refurbished. This can be both expensive and hazardous. The take off and landing of aircraft are typically the highest risk portions of a mission, and each takeoff and landing increases the risk of damage or loss of the aircraft and payload. This is particularly true for lighter-than-air aircraft which tend to be large and relatively slow-moving. As a consequence, there is a need to reduce the cost and risk of long endurance aeronautical operations.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIGS. 6A-6C show several mating configurations for long endurance airship operations, according to one example of principles described herein.

Throughout the drawings, identical reference numbers designate similar, but not necessarily identical, elements.

DETAILED DESCRIPTION

Figure 1:
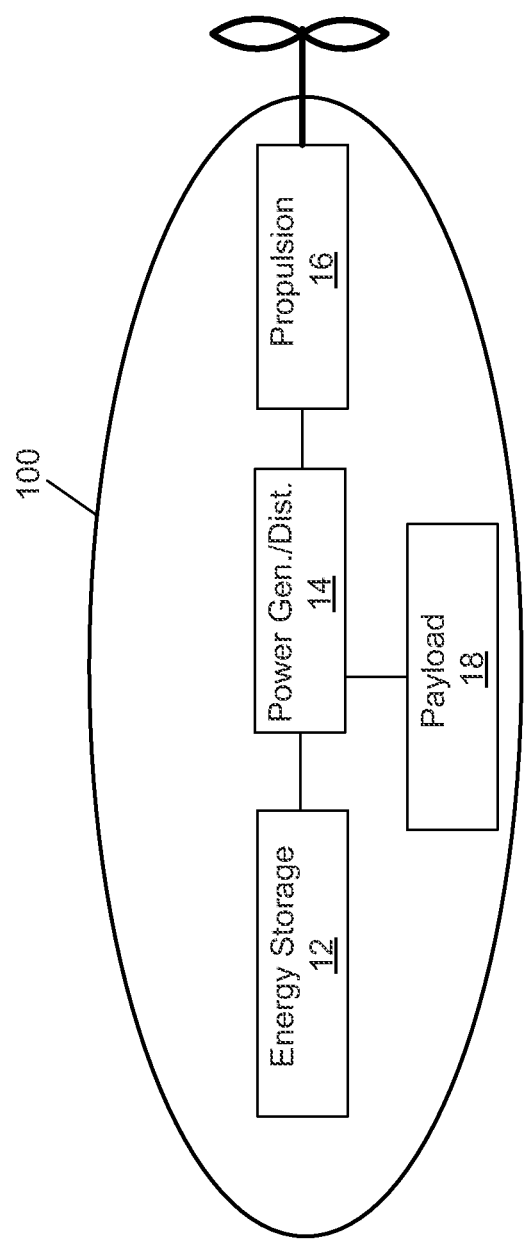
FIG. 1 is a schematic diagram of a high-altitude long-endurance (HALE) airship, according to one example of principles described herein.

There is a recognized need for long-endurance aeronautical operations. Desirable missions include low-altitude or tropospheric radio relay, high-altitude or stratospheric radio relay (aircraft supporting this mission are sometimes called "stratsats"), low-altitude surveillance, high-altitude surveillance, signals intercept, and in situ atmospheric observations, among others. Many of these missions could, conceivably, persist for months or years. For example, an operator of a stratospheric radio relay might desire a single aircraft to remain on-station for years (if such a feat were possible) in order to maximize return on investment and minimize the chance for loss of (or damage to) the aircraft during launch, recovery, and low-altitude operations. Barring the availability of an aircraft that can remain aloft indefinitely while performing a useful mission, an operator might be forced to rely on multiple aircraft which are "cycled" in such a way that one aircraft is always "on station" performing its mission. A counter-piracy surveillance mission could also benefit from a long-endurance aircraft that could remain aloft and on-station, performing its mission for months or years (or indefinitely).

Unfortunately, current aircraft are limited in their achievable endurance. Unmanned heavier-than-air aircraft can operate for tens of hours without refueling, and even lighter-than-air aircraft (which I will call "airships") are generally limited to operations on the order of a few days. The Airship Association, on its web site in 2010, reported that the non-rigid airship record for un-refueled distance and endurance remains the flight of the US Navy ZPG 2 'Snowbird' in March 1957, which covered 15,205 kilometers in 264 hours. This is a flight of 11 days. Steve Fossett's solo around-the-world balloon flight did not involve a propulsion system per se, and was only slightly longer at 14 days, 20 hours. Endurance of unmanned airships is generally limited by fuel and, to a lesser extent, leakage of lifting gas. This low endurance means that an airship must either be refueled in-flight, or return to the ground for refueling, refurbishment and subsequent re-launch. Airships tend to be delicate and their launch and recovery, and low-altitude operations, represent a time of significantly increased risk. Also, airships tend to have relatively low speed so travel time to-and-from the mission area adversely affects overall system usefulness.

Previous inventors have sought to solve some of the issues noted above, as well as other issues, but have not recognized the benefits of mating together distinctly different airships with differing capabilities in order to reduce the cost of long-endurance operations. A few of these references are noted below along with a non-exhaustive discussion of differences relative to the present invention.

U.S. Pat. No. 1,818,138, awarded to Howland in 1931, teaches longitudinally coupled airships which can be coupled and decoupled in flight. The disclosure includes a discussion of electrical connections between the airships and the potential for one airship which is totally or temporarily out of commission to be pushed or pulled by the other airship(s). Howland cites safety and operational benefits. However, he does not recognize the benefits or teach distinctly different airships with differing capabilities, and the swapping of multiple support airships in support of a single payload airship, to reduce the cost of long-endurance operations. Indeed, Howland does not appear to address the question of long-endurance operations where even a single one of his airships may remain aloft, performing useful work, for a long or indefinite period of time. Airships of similar design, as taught in Howland, would not offer the economic benefit described herein for long-endurance operation of a payload airship.

U.S. Pat. No. 2,863,618, awarded to Doyle in 1958, teaches wingtip-to-wingtip coupling of heavier-than-air aircraft, such as a bomber and one or more fighters, in order to extend the range of the fighters. While coupled together, the engines of the fighters can be turned off in order to conserve fuel. In this concept, the fighters are essentially "cargo" or "nonfunctional payload" while attached to the parent ship, and only perform their intended function when they are detached. Furthermore, the fighters are designed to operate detached from the bomber in all relevant meteorological conditions. This differs from the current invention where the payload airship performs its primary function while attached to the logistics airship (although it may also operate for short periods of time while detached), and where the payload airship in a preferred embodiment is incapable of performing its full mission (which includes station keeping) in all relevant and anticipated meteorological conditions. Of course, Doyle is focused on heavier-than-air aircraft in contrast to the current invention which is focused on lighter-than-air aircraft.

U.S. application Ser. No. 11/698,969 (Thompson) describes a system of modular airships which may be assembled and disassembled in flight, where an electrical communication system permits navigation, monitoring and/or power subsystems to be shared and/or synchronized, and where the assembled airship provides improved lift and loft characteristics. Thompson also teaches that fluids (such as lifting gas) may be transferred between the modular airships while they are assembled together, and that a different kind of modular airship can be used for maintenance purposes such as refueling, recharging, or downloading information. However, Thompson does not describe a system where the modular airship is incapable of operating in all relevant and anticipated meteorological conditions, or where a logistics or support airship is required to be continuously mated to a modular airship (except possibly for short periods of time to replace one airship with another) in order to perform the mission. Airships of modular design, as taught in Thompson, would not offer the economic benefit described herein for long-endurance operation of a payload airship.

Numerous concepts have been proposed for long-endurance airships—including some that could potentially stay aloft unrefueled for months or years. These airship concepts tend to involve very large and expensive airships with limited payload capacity—on the order of only a few percent of total vehicle mass.

An untethered airship, intended to remain roughly stationary with respect to the Earth despite the effect of winds, must support power generation and propulsion sufficient to overcome wind-induced drag. Drag tends to be proportional to surface area and also tends to be proportional to the second power (square) of airspeed (which is the equivalent of wind speed if the airship is attempting to remain stationary with respect to a point on the Earth). Power necessary to overcome the drag is proportional to the third power (cube) of airspeed. It is recognized that a "sweet spot" exists in the lower stratosphere where ambient winds are generally low. However, even when operating at these altitudes (which are only suitable for some missions), there is a need to provide power generation and propulsion for peak wind speeds in the range of 20 to 50 m/s (depending on location). Because of the relationship between wind speed and drag, the power generation and propulsion systems are "driven" in an engineering sense by these peak wind speed conditions. For example, an airship that relies on hydrogen fuel and a system of fuel cells for power generation must maintain a large supply of fuel to survive through the peak wind speed conditions, must carry a heavy complement of fuel cells or batteries to generate high levels of peak power, and must carry a heavy complement of engines and propellers to generate sufficient thrust to overcome the effects of drag (and thereby remain stationary with respect to a point on the Earth, despite the ambient wind). This weight penalty, in turn, forces the airship to be relatively large and expensive. Lockheed Martin has proposed a high altitude airship that is 500 feet long and 160 feet in diameter, and can carry 4000 pounds of payload. Sanswire has proposed a "stratsat" which is 245 feet long, contains roughly 1.3 million cubic feet of lifting gas, and can carry 3000 pounds of payload. The unit cost of this system is reported to be in the range of $30 million. The National Aeronautical and Space Administration (NASA) assessed a number of heavier-than-air and lighter-than-air concepts for a pair of candidate high-altitude long-endurance missions (radio relay and hurricane chasing): one representative fuel-cell-based design ("Concept 12" optimized for radio relay) was roughly 500 feet long, weighed roughly 30,000 pounds, yet carried only about 500 pounds of payload. In order to remain on-station under the projected worst-case winds, this NASA concept devoted almost 21,000 pounds of gross vehicle weight to propulsion, fuel cells, and fuel and tankage. Hence the vehicle support systems needed to support the mission out-weighed the actual payload by roughly 40:1, and the overall size of the vehicle was driven by the need to lift these various support systems.

As an airship of a given geometry gets larger, its volume and associated lift capacity go up as the cube of each linear dimension yet the hull weight only goes up as the square of each linear dimension (assuming the hull material can remain the same thickness, so that its weight is proportional to surface area). So a larger airship can carry more weight after allowing for the increased weight of the hull. However, drag is also roughly proportional to surface area so the weight of the associated propulsion system and power generation system increases as well (roughly in proportion to vehicle surface area). Total fuel requirement for a given duration mission, in a nominal meteorological condition, will also increase in proportion to surface area. Hence, payload capacity tends to increase only relatively slowly as the size of the airship design is increased. NASA estimates for payload mass fraction (payload mass as a fraction of total vehicle mass) of its high-altitude long-endurance airship concepts are on the order of 1 to 2 percent. As a consequence, high-altitude long-endurance airship designs tend to be very large and expensive, yet support only limited payload capability. Thus, there is clearly a need for system concepts that can support long-endurance aeronautical missions at reduced cost.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The invention is based on the idea of a tandem or multi-vehicle airship where the separate subsystems such as payload, energy storage, power generation, and propulsion, are collectively carried by two or more airships which can be mated and demated while in flight. For purposes of description, an airship dedicated primarily to payload will be called a "Payload Airship" or PA. Similarly, an airship dedicated primarily to support subsystems such as energy or fuel storage, power generation, and propulsion will be called a "Logistics Airship" or LA. When operating together on-station, a PA and LA can perform all the functions of a traditional HALE airship. For example, the tandem combination can support the payload mission requirements while performing station-keeping in strong winds. The PA is relatively small compared to a traditional HALE airship since it must only be large enough to carry the payload—although it might also support limited energy storage, power generation and propulsion capability (for example, enough to support payload power requirements while maintaining attitude and heading control when it is not mated to a LA). The LA is expected to be larger than the PA since it must carry the support systems for long endurance and/or peak wind conditions. The LA might be similar in size to a prior art HALE airship intended for the same duration mission, although this is not required. The LA can be mated and demated from the PA while in flight—for example, while the PA is operating on-station. When one LA has exhausted its fuel supply, it can be replaced with another LA. Hence the PA remains on-station, supported by the new (nearly fully fueled) LA, while the depleted LA is returned to base for resupply.

In this tandem or multi-vehicle airship system, the PA is relatively small and low-cost compared to a single HALE that could support an equivalent long-endurance mission in the same meteorological conditions. Also, from a conceptual standpoint (and ignoring vehicle losses due to accidents or war), only a single PA is required since it can remain on-station indefinitely. The risk of payload loss is relatively low, since the PA stays aloft indefinitely and avoids the relatively risky activities of low-altitude operation, launch and recovery (except for the first launch and climb to altitude). The LA elements are cycled back-and-forth between a ground base and the PA. The LA elements do not carry a payload (in the baseline concept) and can be sized for optimum mission duration and cost-effectiveness, among other possible criteria. For example, the LA might be the minimum size needed to allow for continuous mission support while requiring only two LA for any given PA (accounting for travel time and refueling/maintenance time). Because they do not carry a payload and can be generally smaller than a traditional HALE designed for the same mission, they are relatively lower-cost.

Importantly, by splitting the payload and support functions onto different airships, this tandem concept incorporates the concept of "Interchangeable parts" which has been generally beneficial to the technical arts. An LA can potentially support a variety of PA (and their associated payloads), enabling a single service provider with a plurality of LA to support a variety of customers and diverse applications. From an aggregate standpoint, LA's can then be "pooled" or shared across applications in order to minimize the cost of achieving a given level of mission availability or a given level of mission reliability.

FIG. 1 illustrates a HALE airship 100 along with several of its key subsystems. These comprise an energy storage subsystem 12, power generation and distribution subsystem 14, propulsion subsystem 16, and payload 18. Many alternatives exist for each of these subsystems. For example, the energy storage subsystem 12 might be tanks of gaseous or liquid hydrogen; the power generation and distribution subsystem 14 might include a stack of fuel cells designed to generate electrical power when supplied with hydrogen from the energy storage subsystem 12 and oxygen (either stored on board or ambient), and the propulsion system 16 might be a set of electric motors and propellers. HALE concepts include multiple alternatives for these subsystems such as alternative fuels, solar power, regenerative systems that can store solar power either in rechargeable batteries or alternative form (including electrolysis of water into hydrogen and oxygen), internal combustion engines, jets, and the like. FIG. 1 is not intended to be a complete or exhaustive illustration since it is also recognized that other subsystems would be present in a practical airship—such as command and control subsystems, navigation, attitude and heading sensors, launch/recovery accommodations, and the like. However, FIG. 1 provides sufficient description to illustrate the major differences and benefits of the present inventive concept.

The engineering community has striven for years to develop practical HALE airship designs that can either remain aloft indefinitely (on the order of years), or merely for very long periods of time (months). The inventor is not aware of any such airship design that has been successfully flown for such long periods of time. In a practical or achievable design, if the endurance of the airship is less than the length of the mission (such as a radio relay mission, or a counter-piracy surveillance mission, which could require mission support for an indefinite period of time into the future), continuous mission support requires at least two airships which would "take turns" providing support in a given area. Specifically, while one airship is providing mission support, the other airship is returned to base, refueled and possibly refurbished, and thence returned to the mission area. If the system operator or customer is concerned about hardware losses, a third airship might be procured to provide a spare asset. Typically, each of these airships (two or three) would be similar in design and capabilities, and similar in cost.

The cost of an airship depends on many factors and detailed cost estimation can be exceedingly complex. However, the following analysis illustrates the benefits of the illustrative long duration airship methods and system. The economic cost of an airship can be estimated based on: a) the projected weights of the individual subsystems; and b) "cost coefficients" or cost ratios that associate an approximate cost per unit of weight (e.g., pounds or kilograms) for each subsystem. This approach will not yield an accurate absolute cost for any given airship; however, for airships of similar technology content and not too dissimilar sizes, this approach can provide a crude indication of relative cost.

The subsystem weights can be estimated based on the particulars of a candidate design. For example, the NASA Concept 12 optimized for a radio relay mission of 6 month duration, unrefueled, resulted in a HALE airship design with performance and weights for key subsystems tabulated in Table 1 below. This same airship design could be used to carry certain alternative payloads of similar weight, such as surveillance or signals intelligence payloads.

The cost coefficients can be derived from historical data on fielded systems (if such data can be obtained), or estimated based on engineering experience. Estimated cost ratios in Table 1 are for illustration only.

TABLE 1

Exemplary Subsystems for HALE Radio Relay

| SUBSYSTEM | PERFORMANCE | ESTIMATED WEIGHT (KG) | ESTIMATED COST RATIOS | ESTIMATED COST |
|---|---|---|---|---|
| HULL | 136834 m³ plus structures/ballonets | 4,738 | $500/kg | $2.4M |
| FUEL & FUEL STORAGE | 6670 kWh | 3,335 | $30/kg | $0.1M |
| POWER GENERATION (fuel cell stack and PMAD) | 705 kW | 4,305 | $1,300/kg | $5.6M |
| PROPULSION | 12,655 N | 1,798 | $700/kg | $1.3M |
| PAYLOAD | (unspecified) | 212 | $20,000/kg | $4.2M |
| TOTAL* | | 14,388 | | $13.6M |

*Note: Using undisclosed cost coefficients and assumptions for system integration, and assuming a production run of 18 airships, NASA calculated a unit flyaway cost of $41M—roughly 3x higher than calculated here. Nevertheless, for the purpose of illustration, I will rely on the tabulated cost ratios (coefficients).

For the exemplary system of Table 1, the unit production cost of one airship is estimated at $13.6M based on the tabulated cost ratios. A system intended to support a mission of indefinite duration would require at least two such airships and possibly three (depending on the need for spares and redundancy). It should be recognized that the cost ratios in Table 1 are provided for illustrative purposes only, and should not be construed as necessarily being representative of the costs of particular systems. Costs will depend on the specific technology used, the state of the art in that technology, inflation, and other factors.

Figure 2:
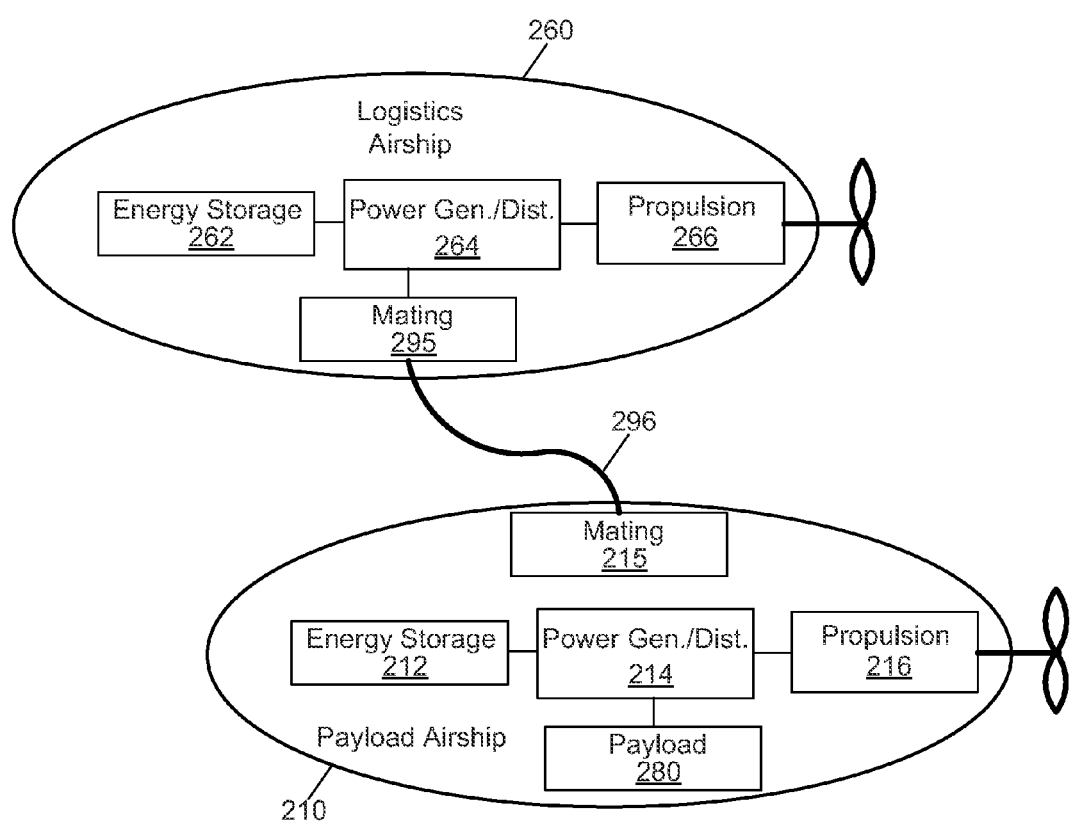
FIG. 2 is a diagram of logistics airships supporting a payload airship, according to one example of principles described herein.

FIG. 2 illustrates in schematic form one embodiment of the present invention. This embodiment comprises two airships where one airship 210 is designated the "Payload Airship" or PA, and the second airship 260 is designated the "Logistics Airship" or LA. In this embodiment, while both airships have energy storage, power generation and distribution systems, and propulsion systems, and the two airships are illustrated similarly, the PA 210 and its energy storage subsystem 212, power generation/distribution subsystem 214, and propulsion subsystem 216 are all relatively small compared to the equivalent LA 260 and its internal subsystems 262, 264 and 266, respectively. The PA only has sufficient lift capacity to lift the payload 280 (identical to, or similar to, the payload 18 in FIG. 1), its small complement of subsystems 212, 214 and 216, and possible minimal additional subsystems such as, inter alia, command and control, housekeeping, and launch/recovery accommodations. It is not able to support long-term autonomous operations or propulsion in peak wind conditions (although it may support heading and attitude control and minimal propulsion for calm or low-wind conditions). Because it does not need to support large quantities of fuel, or high peak power generation and propulsion systems for peak load conditions, PA 210 is relatively small and hence relatively low-cost compared to LA 260. In one example, the payload airship and logistics airship are capable of rendezvous, mating, and derating, while in flight. The payload airship and logistics airship have design capabilities differing by at least a factor of two with regard to at least one of: power generation capability (Watts of generating capacity); propulsion capability (thrust); endurance capability (days of continuous mission support in a defined meteorological environment); and lift capability (gross vehicle weight).

Table 2 illustrates an exemplary cost estimate for the PA based on rough estimates of subsystem sizes in order to support payload operations for short periods of time during LA exchange, attitude and heading control, and launch/recovery in low winds (possibly assisted by a larger airship). These cost estimates use the same cost ratios (coefficients) as the example of Table 1 for a prior art airship designed to carry the same payload in the same meteorological conditions. As may be seen, the overall cost of the airship is substantially less than that of the prior art airship, and is dominated by the cost of the payload. Of course, this PA cannot operate unassisted for extended periods of time, or perform stationkeeping in strong winds.

TABLE 2

Illustrative Subsystems for Payload Airship

| SUBSYSTEM | PERFORMANCE | ESTIMATED WEIGHT (KG) | ESTIMATED COST RATIOS | ESTIMATED COST |
|---|---|---|---|---|
| HULL | 15300 m³ plus structures/ballonets | 1100 | $500/kg | $0.6M |
| FUEL & FUEL STORAGE | 300 kWh @ 2 kWh/kg | 150 | $30/kg | <$0.1M |
| POWER GENERATION (fuel cell stack and PMAD) | 8 kW @ 0.164 kW/kg | 50 | $1,300/kg | <$0.1M |
| PROPULSION | 140 N @ 7.04 N/kg | 20 | $700/kg | <$0.1M |
| MATING SYSTEM | (generic) | 50 | $1000/kg | <$0.1M |

TABLE 2-continued

Illustrative Subsystems for Payload Airship

| SUBSYSTEM | PERFORMANCE | ESTIMATED WEIGHT (KG) | ESTIMATED COST RATIOS | ESTIMATED COST |
|---|---|---|---|---|
| PAYLOAD | (unspecified) | 212 | $20,000/kg | $4.2M |
| TOTAL | | 1,582 | | <$5.0M |

Also shown in FIG. 2 is the LA 260 which is expected to be larger than PA 210 since it contains more extensive fuel and higher peak power and propulsion capability sufficient for longer-term operations (although not necessarily indefinite operations), including operations in peak expected wind conditions. The LA in this embodiment does not contain the mission payload although it does contain command and control and other auxiliary systems (not shown). Because it contains extensive fuel and higher peak power and propulsion capability compared to the PA, it is relatively larger and more expensive than the PA. As a first-order approximation, in this embodiment, it is roughly the same size as a traditional HALE airship intended to support the same length of mission, in the same meteorological environment, with a mission payload. The LA and PA are mated together in this embodiment, and the LA provides power for the mission payload as well as peak power and propulsion capability for peak wind conditions.

Both the PA 210 and LA 260 use a mating subsystem 215 and 295, respectively, in order to provide for transfer of power as well as (possibly) lifting gas and structural/aerodynamic loads. The mating subsystem can take many forms as discussed below. The generic mating system illustrated in FIG. 2 is illustrated as being flexible, with a fixed part 295 and umbilical 296 associated with the LA, and a fixed part 215 associated with the PA. Other designs are possible. Together, the mating subsystems 295 (with 296) and 215 provide for transfer of electrical power from the LA to the PA. They may also provide for data exchange, transfer of gases or liquids, transfer of structural loads (e.g., those associated with differences in buoyancy or forces exerted on the mating system due to hull contact), and transfer of aerodynamic loads associated with drag induced by peak wind conditions on the PA. If these structural and/or aerodynamic loads are supported by the mating subsystem, the LA can provide stationkeeping in peak wind conditions, and the propulsion system in the PA can be reduced in size. Alternatively, if the mating subsystem does not provide for these structural loads, the propulsion system on the PA must be larger so as to compensate for some or all of the drag induced by the peak winds.

In one implementation, a plurality of LAs provide support to a PA. One LA is typically mated to the PA while the remaining LAs are either loitering, or en route, or on the ground. In-flight mating and demating of the LA and PA may occur either with a make-before-break procedure, so that the PA is always attached to at least one LA, or a break-before-make procedure, so that there are short periods of time where the PA is not attached to any LA.

A cost comparison between the previous designs and the present invention can be challenging for a number of reasons. For example, the individual airships will have differing designs, the cost ratios are dependent on many factors varying over time and with technology used, and the overall concept of operations may differ as well. Nevertheless, a first "motivating comparison" can be performed by comparing a high-reliability prior art system of three large HALE airships, each with a payload, with three large airships (LA) without a payload and one small airship (PA) with a payload.[1] Since the combination of LA's and PA eliminates two payloads and adds one small PA plus four mating fixtures, if the small PA and four mating fixtures are less than twice the cost of a payload, the total system cost of the LA's and PA is lower than the cost of the prior art system with three large and identical HALE airships each supporting a payload. Using the rough cost data of Tables 1 and 2 above, the prior art approach would involve three large payload-equipped airships with a total cost (for the three airships) of approximately $41M. Conversely, three LA (priced similar to a prior art airship but without a payload) plus a smaller PA containing a payload would have a total cost (for the four airships) of approximately $33M. In this cost comparison, the absolute costs of the two alternatives are not expected to be accurate and even the absolute value of the difference in cost ($8M) is not expected to be accurate. However, the large relative cost reduction, even with this simplified cost model, indicates the potential for an economic benefit.

[1] Each LA and PA also requires a mating fixture. The mating fixtures could be androgynous, or alternatively they can be designed such that the LA fixtures can each mate with the PA fixture, but not with each other.

Interchangeable Parts

There are additional benefits of the inventive concept. One benefit is that the inventive concept extends the idea of interchangeable parts. Interchangeable parts provide significant benefits including greater operational flexibility, lower replacement costs, ready availability of spares, etc. In the present case, the PA can be considered a "special purpose" or "custom" part whereas the LA can be considered a "general purpose" part. Different missions and customers may require different PA and payloads, but many could rely on a common LA. Hence, LA's can be built in large numbers to support a plurality of missions and customers, thereby enabling economies of scale in production (thereby reducing unit production costs). Furthermore, a group of missions or customers could share a group of LA for reliability and redundancy purposes, reducing the total number of LA required by the group of missions or customers for a given level of mission availability, and so reducing overall life cycle costs for supporting the plurality of missions (i.e., when compared to separate missions each with their own customized HALE airships including redundant units).

Sharing of LA's can provide for a novel business concept where a service provider offers generic logistics support for a multitude of customers (and/or missions) with the service provider delivering payload airships to desired locations, and then supporting the payload airships with a plurality of logistics airships. The service provider relies on economies of scale in production and operations, and efficient sparing and redundancy associated with pooled resources, to reduce overall costs. Total fees charged to a given customer, to provide for delivery and long-term support of a given payload, would be less than the costs associated with a plurality of dedicated airships for each mission sufficient to achieve the same level of mission availability.

Tailored Logistics Airships

Figure 3:
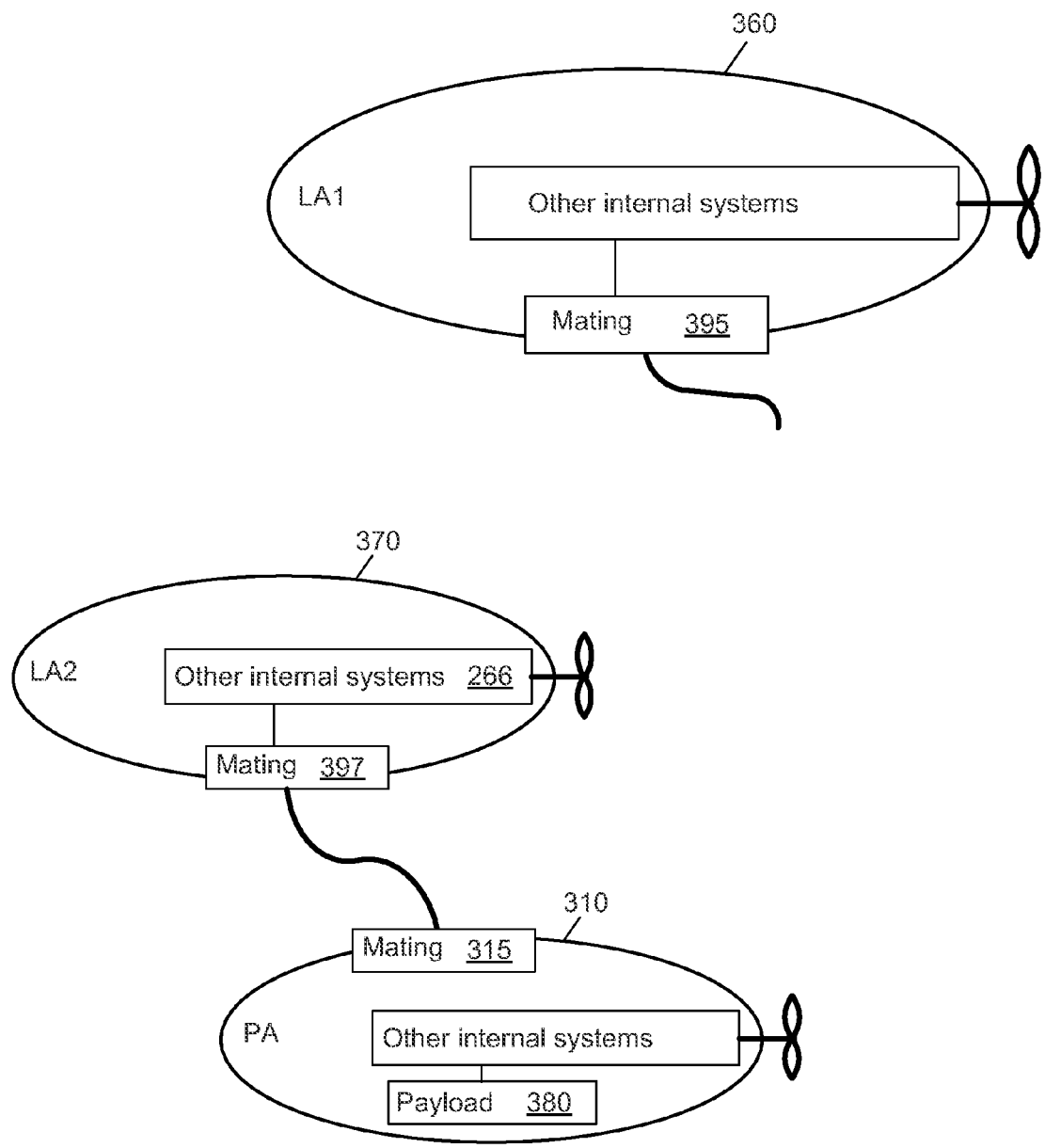
FIG. 3 is a diagram of two logistics airships which support a payload airship, where the logistics airships have different designs, according to one example of principles described herein.

FIG. 3 is a diagram of an illustrative example of a long endurance airship system where at least two different types of LA, numbered 360 and 370, can each mate with, and support, a PA 380. In the illustrated example, the two different LA differ in peak power and propulsion capability, with LA1 360 able to support higher peak power and propulsion (thrust) than LA2 370. LA1 and LA2 may be generally the same size or different sizes. If generally the same size, LA2 (with lower peak power and propulsion capability, hence lower weights for these subsystems) could carry substantially greater fuel stores than LA1 and could therefore remain on-station with the PA for substantially longer periods of time (but with a more limited thrust capability). When weather forecasts indicated an impending period of high winds, LA1 could be used while LA2 is returned to base for refueling and refurbishment.

Since power requirements are proportional to surface area as well as the third power of wind speed, LA2 could also be smaller than LA1 while still providing significant on-station support time. The weight of a power generation subsystem is assumed herein to be roughly proportional to peak output power (for a given technology); similarly, the weight of a propulsion subsystem is assumed herein to be roughly proportional to peak thrust (for a given technology). Subsystem cost is assumed to be roughly proportional to weight (for a given technology). As a consequence of the third-power relationship between wind speed and peak power and propulsion needs, significant cost savings can be achieved for airships with lower wind speed requirements.

Since peak winds tend to occur within only a few months every year, LA1 could be sized for support during the peak wind condition (high peak power and thrust; fuel stores sufficient for the duration of the peak wind season), while LA2 could be sized for support during the remainder of the year (lower peak power and thrust, but fuel stores sufficient for the remainder of the year). For example, one study of stratospheric winds in support of high altitude airship concepts [Modica, 2007] indicated that winds above Colorado Springs, Colo., at the 50 hPa level (roughly 65,000 feet) tended to be in the range of 10 m/s or less for most of the year, but were in the range of 20-30 m/s for one or two months of the year, and during these periods, peak wind speeds occasionally hit 40 m/s. Thus, if LA1 is designed for a peak wind speed of 50 m/s, and if LA2 is designed for a peak wind speed of 20 m/s, and the two are equal in size (hence equal drag at the same wind speed), the power generation and propulsion subsystems will differ in weight and cost by roughly a factor of $(2.5)^3$ or approximately 15:1. In terms of total fuel load, since LA2 generally experiences lighter winds than LA1, it can stay aloft longer than LA1 with the same fuel load. But because the power generation and propulsion systems are smaller, the airship can be smaller as well—and this reduces drag and allows for a further reduction in peak power generation capability, propulsion (thrust) and total fuel storage. Alternatively, LA2 could be the same size as LA1 but trade power generation and propulsion capability for greater fuel stores, enabling much longer endurance. Of course, intermediate designs are also feasible (slightly smaller airship but with moderately longer endurance).

Table 3 below shows one example of a long endurance airship system where LAs of two different and tailored designs are used to support a single PA, in this embodiment, LA1 is designed for peak wind conditions and is sized (in this example) similar to NASA Concept 12, although LA1 is intended for a mission duration of only 90 days (corresponding to the period of peak winds). LA2 is designed for a 400 day mission with peak winds of 20 m/s and average winds of 5 m/s. As may be seen, it is slightly smaller than LA1 but substantially lower in unit cost due to the reduced weight of power generation and propulsion systems designed for the lower peak winds. The mission durations of LA1 plus LA2, taken together, allow for the typical period between peak wind conditions in the lower stratosphere—around 14 months—with design margin. The PA is even smaller than LA2—only about 68 meters long—with on-board fuel stores sized for an aggregate of 10 days of stand-alone operation intended to support a plurality of short intervals of time for docking/undocking on-station (with a break-before-mate mating concept), and also autonomous launch/recovery if required. For this exemplary sizing exercise, the PA is designed to handle the same peak wind conditions as LA2 so that a flexible non-structural mating system could be used for the period of time that the PA is being supported by LA2. However, with this PA design, a mating system that can support structural loads would be required for peak wind conditions during support by LA1.

TABLE 3

Illustrative System with Two Tailored Logistics Airships and One Payload Airship

| PARAMETER | UNITS | LA1 | LA2 | PA |
|---|---|---|---|---|
| Length | meters | 145 | 119 | 68 |
| Volume | meters^3 | 131,000 | 73,800 | 13,800 |
| Surface Area | meters^2 | 15,400 | 10,500 | 3,420 |
| Max Wind | m/s | 56 | 20 | 20 |
| Avg Wind* | m/s | 10 | 5 | 5 |
| Endurance | Days | 90 | 400 | 10 |
| Payload + Avionics Power | kWatts | 1.25 | 1.25 | 1.125 |
| Max Drag | Newtons | 13,200 | 1200 | 350 |
| Peak Power | kWatts | 687 | 23 | 8 |
| Avg Power* | kWatts | 5.16 | 1.58 | 1.23 |
| Hull Mass | kg | 4610 | 3140 | 1020 |
| Propulsion Mass | kg | 1740 | 54 | 18 |
| Power Gen. Mass | kg | 4200 | 143 | 55 |
| Fuel + Tankage Mass | kg | 3200 | 4360 | 85 |
| Payload Mass | kg | | | 212 |
| Mating System Mass | kg | 50 | 50 | 50 |
| Gross Vehicle Weight | kg | 13,80 | 7759 | 1440 |
| Estimated Cost | | $9.13M | $1.96M | $4.89M (payload = $4.24M) |

*Avg wind is the assumed wind speed that, if maintained continuously and without variation for the duration of the mission (endurance) would result in the indicated avg drag and avg power upon which total mission duration energy consumption, and required fuel mass, is calculated.

The entries in Table 3 are estimates based on the general concepts described below. First, it should be understood that all values are approximate, intended for illustration, and are only given to at best three significant digits. The estimation equations used in this example are simplified and a detailed design would likely result in different values due to differences in airship shape, materials, technologies, and other factors.

The airship hull geometry and lifting volume is assumed to be a scaled version of NASA Concept 12. Of course, other shapes are possible and a different shape would result in different airship characteristics. Total volume is calculated by multiplying gross vehicle weight (GVW) by 9.524, which is the approximate ratio embodied by the NASA Concept 12. Once total volume is determined, length is scaled from the NASA Concept 12 by multiplying by the cube root of the ratio of volumes. Surface area is also scaled by multiplying by the ratio of volumes raised to the ⅔ power.

The equations are iterative since airship size depends on GVW, but GVW is affected by hull surface area (since each square meter of surface area is assumed to have a characteristic weight). Also, drag is a function of surface area and the propulsion system and power generation system capabilities and masses are sensitive to drag.

The maximum wind condition along with airship surface area influences the calculation of peak drag, associated peak propulsion system capability to compensate for peak drag, and peak electric power generation system capability required to support the propulsion system (assuming electric motors). The peak electric power generation capability is scaled from the NASA Concept 12 airship design based on the ratio of surface areas and the cube of the ratio of design peak wind speeds.

The PA should be sized first, before the LA's, since part of the power generation requirement and propulsion requirement for the LA's will depend on the burden represented by the PA. In the example of Table 3, the burden of the PA, levied on the LA's, is calculated by applying a heuristic algorithm for LA peak power (propulsion). This algorithm augments the LA airship volume, calculated to carry the LA gross vehicle weight (GVW), by the PA airship volume in order to calculate an equivalent surface area for purposes of drag calculations. To a first order of approximation, this is equivalent to an assumption of conformal airship designs such that the effective drag of an LA plus PA is roughly equivalent to the effective drag of a single larger airship with the same total lifting volume of the two airships taken together. This heuristic algorithm is imprecise since it fails to account for the detailed drag characteristics of the tandem combination, which depend in turn on the mating technique discussed below. For example, a loosely-coupled tandem configuration, such as illustrated in FIG. 2, would have greater drag. In a more detailed design exercise, these detailed drag characteristics (tandem combination) could be assessed based on the specific airship geometries and selected mating configuration.

Average power for propulsion can be estimated from peak power (propulsion) by calculating the cube of the ratio of "average wind" to peak wind, and multiplying peak power (propulsion) by this number. Note that for this calculation, "average wind" is the wind speed that, if maintained continuously over the mission duration, would result in the expected total energy consumption (propulsion) for the mission. This is different from the average meteorological wind speed. In Table 3, exemplary values for this parameter of "average wind speed" have been assumed, rather than calculated or measured. One way to determine expected total energy consumption (propulsion) would be to run Monte Carlo simulations of a mission using a candidate airship design over representative meteorological conditions for the projected mission interval. These Monte Carlo simulations could be used to generate expected values for total energy consumption (propulsion), among other things. One could then calculate average power (propulsion) and average wind speed (as used here) based on the drag characteristics of the candidate airship design.

Both peak and average power (propulsion) must be augmented by the power requirements for non-propulsion needs (such as, inter alia, avionics and payload) to yield peak and average power (total). In Table 3, the airships were sized based on a budget of 1 kW for payload and 0.125 kW for avionics. The PA carries a payload and all airships carry avionics (sized equivalently in this exercise). While operating in a tandem configuration, the PA airship consumes none of its own fuel, relying instead on power provided by the LA. Hence the LA provides electrical power for its own avionics, the payload and avionics of the PA, and propulsion needs for the tandem combination. When the PA is operating independently, it must rely on its internal fuel stores. In the example of Table 3, the PA was sized to support independent operations in nominal winds for an aggregate of 10 days. This would be sufficient for a large number of mate/demate cycles (assuming break-before-make) plus independent launch/recovery, if required by the system.

Hull mass is estimated, in this example, by multiplying hull surface area with a characteristic ratio of mass per square meter taken from the final NASA Concept 12 airship design. The thickness and weight (per square meter) of hull is dependent on several factors including expected meteorological conditions, pressure differential between internal and external spaces, and physical durability. Also, the hull may include special sections and accommodations for launch-recovery, mating, and the like. These considerations will affect total hull mass in a more detailed design.

Propulsion system mass is estimated, in this example, by multiplying peak power (propulsion) by a characteristic ratio of mass (propulsion system) per kW (propulsion) taken from the final NASA Concept 12 airship design. Similarly, the power generation mass is estimated, in this example, by multiplying peak power (propulsion+payload+avionics) by a characteristic ratio of mass (power system) per kW (total) taken from the final NASA Concept 12 airship design.

Fuel and tankage mass is estimated, in this example, based on average power (total) over the mission duration, with a 50% safety margin, assuming hydrogen gas in high pressure tanks with fuel mass fraction of 0.268. Hydrogen has an energy density of 39000 Wh/kg, and a conversion efficiency of 50% was assumed. Payload and mating system masses were taken as assumptions for this example.

The combined cost of LA1+LA2+PA in this example (Table 3), including the payload in the PA, is roughly $16M based on the same cost coefficients used above. In contrast, a prior art system of three large airships similar in size to LA1, but each carrying a payload, would cost roughly 3×(9.13+4.24)~$40M. Thus, if sparing and redundancy for logistics airships is shared across a large number of users, customers or missions, as is feasible for the inventive concept, the effective total system production cost associated with support for a single payload can be on the order of 40% of the cost of three large HALE airships (each with a payload) as contemplated in the prior art. Of course, detailed cost comparisons will depend on payload costs as well as LA and PA designs and mission requirements. Nevertheless, the present invention offers the potential for significant cost savings compared to the prior art.

Using the design and costing principles noted above, one can explore design excursions. For example, a logistics airship intended to support the same peak wind conditions as LA1, specifically 56 m/s, but "average wind" of 20 m/s instead of only 10 m/s, for a design mission duration of 150 days, would have to be on the order of 450 m long, have a GVW of roughly 420,000 kg, and would cost on the order of $96M. However, if the design mission duration is reduced to 45 days, the airship may be sized at roughly 215 m, 45,000 kg, and $20M. If the design mission duration is reduced further to 30 days, the airship may be sized at roughly 180 m, 27,000 kg, and $14M. Hence, one embodiment tailored to areas with relatively long-duration and high "average wind" is to use multiple LA with high peak wind capability during the periods of peak winds, but relatively low endurance, cycling them as needed for refurbishment and refueling, and one or more LA with lower peak wind capability for the long periods of low wind. This approach may yield lower total system cost than a system with only two logistics airships, where the "high wind" airship is required to support an extended mission duration of many months.

Mated Systems of Three or More Vehicles

Figure 4:
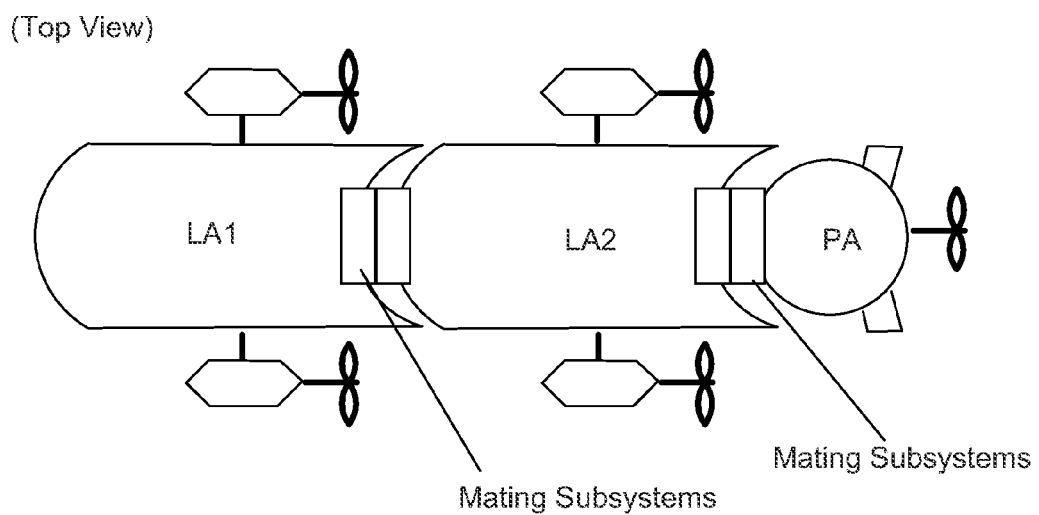
FIG. 4 is a diagram of two logistics airships simultaneously supporting a single payload airship, according to one example of principles described herein.

FIG. 4 is an illustrative example of a long endurance airship system wherein a multi-segment airship is comprised of three airships mated together. FIG. 4 illustrates two LA and one PA, but other combinations are possible including two PA and one LA, or a plurality of LA and a plurality of PA. When more than two airships are mated together, at least one of the airships must have a plurality of mating fixtures. In principle, all airships could have a plurality of mating fixtures, although this is not required.

In a configuration with two LA and one PA, the two LA can jointly support the energy storage, power generation and propulsion needs of the three-vehicle system. The LA might also differ in terms of unique support capabilities, such as inter alia solar regenerative power, alternative command and control, or communications systems.

In a configuration with one LA and two PA, the two PA might support different payloads, or two similar payloads tasked to work together or independently.

Mating Fixtures and Systems

Figure 5A:
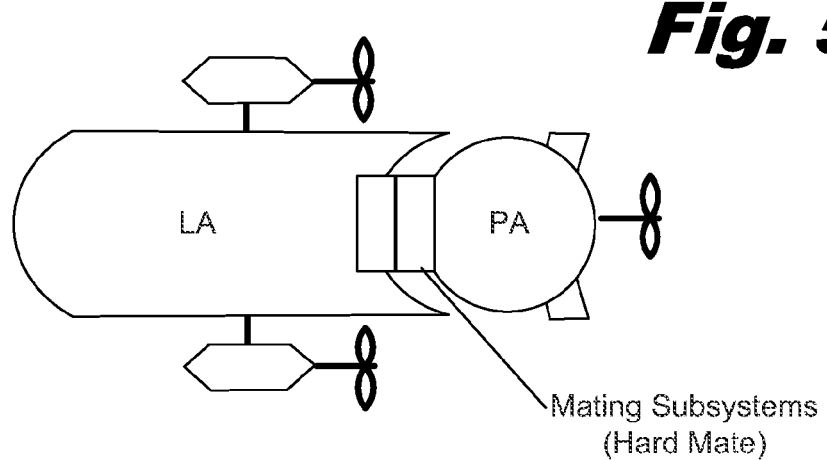
FIGS. 5A-5D show several mating configurations between logistics airships and payload airships for long endurance operations, according to one example of principles described herein.
Figure 5B:
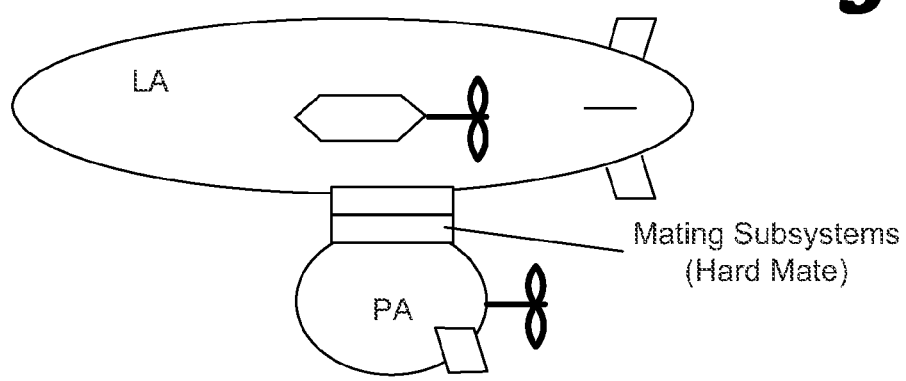

FIGS. 5A-5D illustrate a number of mating systems which may be used for docking two or more airships together. In FIG. 5A, a top view similar to the triple airship embodiment of FIG. 4 illustrates an LA and PA mated longitudinally with a hard mate fixture that provides for transfer of structural and aerodynamic loads as well as electrical power. A longitudinal mating configuration will tend to reduce drag in comparison to an alternative mating configuration such as shown in FIG. 5B.

Turbulence around the junction between the LA and the PA should be minimized if feasible and cost-effective, since turbulence will contribute to drag and thereby increase energy requirements. Turbulence will be reduced if the gap between the LA and the PA is small and the outer dimensions of the two airships are commensurate as shown; however, a small gap may make it challenging to correctly position the two airships for aerial rendezvous and successful mating/demating. If the gap consistent with reliable rendezvous, mating and demating is considered excessive, methods to minimize resulting drag include, inter alia:

a) an inflatable "balloon skirt" that can be reversibly filled, the balloon skirt located within the gap or at least the perimeter of the gap, so as to create a more seamless joint between the two airships which improves the aerodynamics of the system by minimizing turbulence. The balloon skirt is deflated and possibly pulled away from the junction for mating and demating, and inflated for normal tandem operations;

b) reversibly extendable mating fixtures which can provide for rendezvous and mating/demating with minimal concern for structural interference (i.e., in an "extended" configuration), and which can then be "retracted" so as to bring the two airships closer together in a controlled manner (following rendezvous and mating) for tandem operation with reduced drag; or c) ambient air can be allowed to enter the LA through an inlet, channeled to the gap with suitable ducting, and exhausted into the gap in a controlled manner so as to provide overpressure in the gap and thereby create more laminar flow around the PA.

The techniques described above can be used separately or in combination. For example all three techniques could be combined in a single embodiment.

Figure 5C:
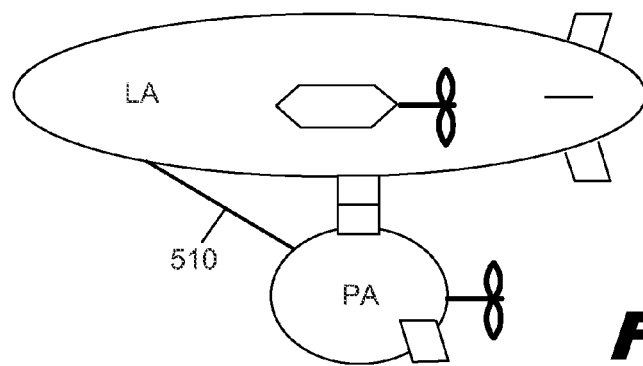

FIG. 5B illustrates an "external carriage z-axis" mating configuration where the PA is mated below the LA with a hard mate fixture that provides for transfer of structural and aerodynamic loads as well as electrical power. If the mating fixture is vertically-aligned with the center of mass and center of lift of the LA, non-zero airspeed in this configuration will generate a torque that will tend to force the LA into an undesirable "nose down" attitude. This can be compensated in several ways including, inter alia:

a) Vectored thrust on the LA;
b) Deflecting surfaces (elevators or canards or both) on the LA;
c) A compensating propulsive force from a propulsion system on the PA (if the PA is so equipped);

FIG. 5C illustrates a similar "z-axis" mating configuration where the PA is mated below the LA, although in this case the system uses a soft mate fixture that provides for transfer of electrical power but not structural or aerodynamic loads. In order to compensate for this lack of support, one or several cable(s) or guy wires) is/are provided for strain relief (one guy wire 510 is shown).

Figure 5D:
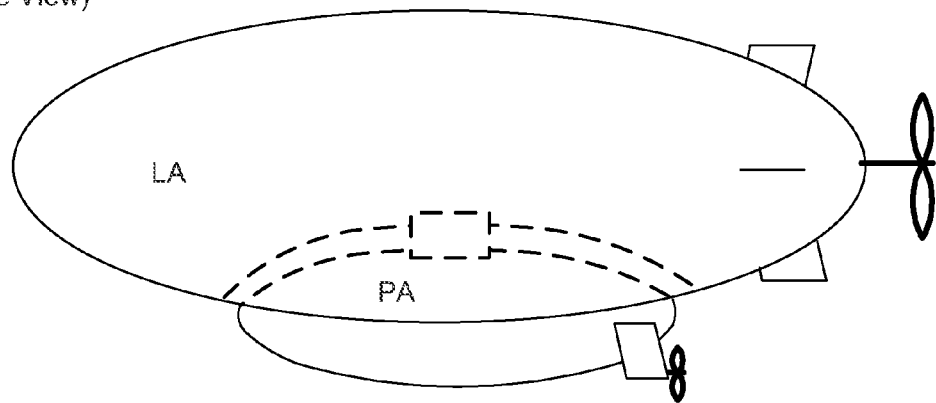

FIG. 5D illustrates an "internal carriage z-axis" mating configuration where the PA is mated below the LA, within a nadir cavity or crater in the LA that allows the tandem airship to experience lower drag forces than if the two airships were mated in an external carriage configuration as shown in FIG. 5B. As with the configuration of FIG. 5A, an inflatable balloon skirt can be used to minimize turbulence and drag associated with the interface between the two airships.

Returning to FIG. 3, a flexible mating configuration is shown where the LA and PA are connected by a cable or umbilical that can provide for the transfer of at least electrical power. The cable or umbilical may also provide for the transfer of liquids, gases and structural and aerodynamic loads.

The concept of a cable or umbilical as in FIG. 3 can be combined with the concepts of FIG. 5. For example, an initial rendezvous and soft mate could be achieved with a cable as shown in FIG. 3, at an airship separation distance that minimizes the complexity of airborne rendezvous, and the cable could then be "reeled in" until the PA is proximate to the LA. This technique could be used to help align the mating fixtures for nominal tandem operations.

All the mating fixtures illustrated in FIG. 5 can be augmented with capabilities for liquid and/or gas exchange between the airships. The mating fixtures can be androgynous, meaning that two mating fixtures of identical design will mate with each other, or "differentiated", meaning that a mating fixture on an LA could be mated to a compatible mating fixture of differentiated design on a PA, but could not be mated to an incompatible mating fixture of identical design on another LA.

The mating fixtures on the airships can be at fixed locations on the hulls, as generally shown in FIG. 5, or at movable locations. A movable mating fixture could be mounted on rails so as to provide for adjustable positioning of the mating fixture over a range of locations on the hull. For example, a track longitudinally aligned on the top of the PA could be used to provide a range of locations for the mating fixture on the PA. Various methods of locomotion and locking/unlocking at a desired location may include, inter alia, electric motors driven by power provided through a set of rails, linear induction motors, latches, and brakes.

The reversibly inflatable skirt discussed with regard to the embodiments of FIG. 5A and FIG. 5D can also be used as a means of strain relief for the mating fixture, and can provide for the transfer of some or all of the aerodynamic loads necessary to accommodate tandem operation in high winds. For example, consider the embodiment in FIG. 5A, but augment the PA with an engineered trough running circumferentially around its forward fuselage (i.e., the trough lays substantially in a plane perpendicular to the longitudinal axis of the airship). The mating LA has a reversibly inflatable skirt that can engage this trough when the two airships are properly aligned and the skirt is inflated. Following mating, this inflatable skirt can be inflated so as to engage the trough and thereby provide for transfer of aerodynamic loads.

Rendezvous and Mating Procedures

Rendezvous in the stratosphere can be achieved as long as at least one airship has an ability to maneuver in three dimensions. This condition is satisfied since the LA, at least, has this ability (see also buoyancy and trim control below). However, if ambient winds exceed the airspeed capability of at least one of the airships, the rendezvous and mating phase may involve a period of "downwind drift" following initial rendezvous and before a final mating, able to sustain aerodynamic loads, is achieved. Actual mating is facilitated if both airships have the ability to control attitude and heading; however, this is not a strict requirement.

By way of explanation, "mating" in this disclosure is associated with the act of making a physical connection that can sustain the transfer of electrical power. The physical connection associated with "mating" may also sustain the transfer of gases, liquids, or physical forces, although this is not required. The tandem airship systems illustrated in FIG. 2 and FIG. 3 may be considered to be "mated". A somewhat related concept is "docking", which in this disclosure is associated with the act of bringing two objects into close proximity—for example, the tandem airship concepts illustrated in FIG. 4 and FIG. 5 are "docked" as well as "mated". These concepts have a certain degree of definitional overlap since a mating system also involves two physical objects brought into close proximity; however, in general I will refer to a docking procedure in relation to airship hulls brought into close proximity. All tandem airship concepts disclosed herein require a "mating" procedure; however, not all tandem airship concepts require a "docking" procedure. If a docking procedure is required, the mating procedure can occur either before the docking procedure, during the docking procedure, as an integral part of the docking procedure, or following the docking procedure.

Once two airships requiring docking and mating are in relative proximity, they can achieve physical contact and alignment of their mating fixtures. One method is to "fly one airship into the other", in a controlled manner much as a Space Shuttle docking with the International Space Station. The mating fixtures adapted to such an approach would provide accommodation for misalignment, and as they are mated, would ultimately provide the fine alignment necessary for a soft mate or hard mate as required by the selected embodiment. The mating fixtures might provide for the transfer of physical forces; alternatively, other accommodations on the hull(s) of the airship(s), such as guy wires, struts, and interlocking structural features (such as the inflatable skirt discussed above) might provide for the transfer of physical forces.

Large airships maneuver slowly, and it may be difficult to model airflow between two large airships and provide for suitable control laws to enable reliable approach and docking (if required). The following techniques can be applied to overcome docking and mating difficulties associated with turbulence and close-quarter formation flying of large airships:

As noted previously, an umbilical or cable can be deployed from one airship and used for initial physical contact with the other. For example, the LA could deploy an umbilical that is captured by the PA using mechanical or electromagnetic capture systems. By way of example and not limitation, the mechanical systems could involve mechanical grappling, latching or grasping mechanisms. Electromagnetic capture systems could be based on electromagnetic attraction between the deployed cable, or a probe end at the end of the deployed cable, and the mating fixture (or part of the mating fixture) located on the PA. It is also possible to combine electromagnets with mechanical grappling, latching or grasping mechanisms. Following initial contact, the cable could be "reeled in" by the LA to bring the airships and mating fixtures into contact, and allow a hard mate.

The mating fixtures or initial capture mechanisms can be mounted on a movable platform, for example a rail-borne fixture, so as to allow for rapid repositioning and alignment of the mating fixtures without having to significantly reposition one or both of the airships. A movable platform can be used to ease initial capture, and subsequently repositioned (if necessary) to support final docking.

For mating configurations similar to those illustrated in FIGS. 5A and 5D, where an extended surface exists between the two airships, one or both of the airships could be equipped with a plurality of actuators or repositioners across the extended surface, such as motorized wheels, that can be used to reposition one airship relative to the other as they come into contact. The wheels or actuators would be driven to bring the mating fixtures of the two airships into alignment. Once alignment of the mating fixtures is achieved, one or both of the mating fixtures can be extended to make contact and achieve a mate. Other methods for final mating include, inter alia, retraction of the wheels or actuators (thereby allowing the airships to come into closer proximity) and intentional distortion of the hull(s) around the mating fixture(s) to achieve a mate.

For continuous operation of a PA over extended periods of time, it will be necessary to exchange one LA for another. This can be achieved in a so-called "break-before-make" approach where the PA is demated from a first LA and subsequently mated to a second LA, or a so-called "make-before-break" approach where the PA is mated to a new LA before derating from a first LA. Each of these methods has advantages and disadvantages. The break-before-make approach requires only a single mating fixture on the PA but also requires the PA to operate autonomously for a period of time. This may involve a period of drifting or low-airspeed flight. The make-before-break approach requires at least two mating fixtures on the PA, but does not require any period of autonomous operation.

Figure 6B:
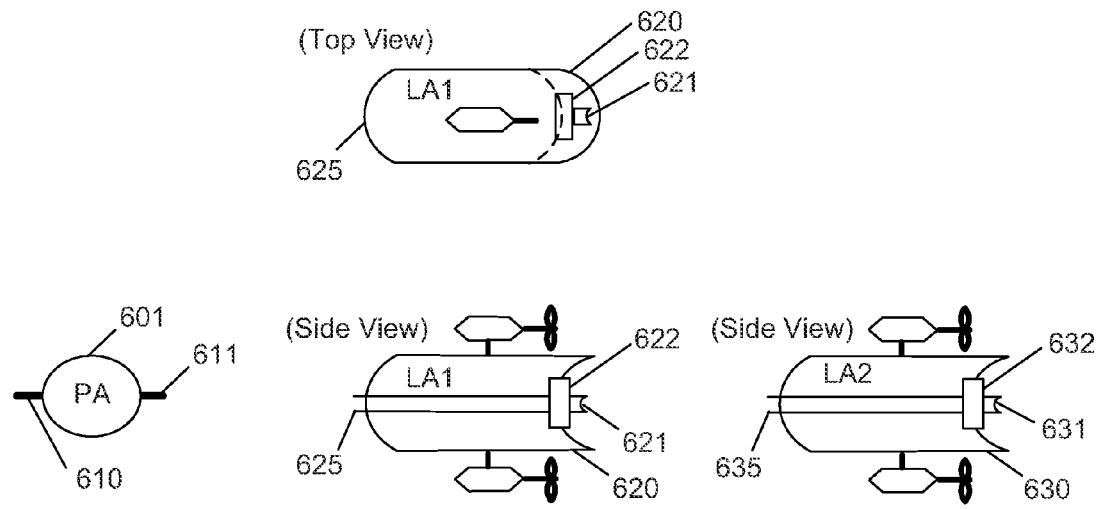
Figure 6B:
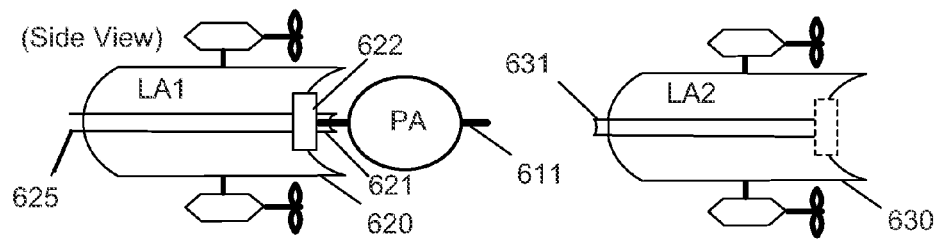
Figure 6C:
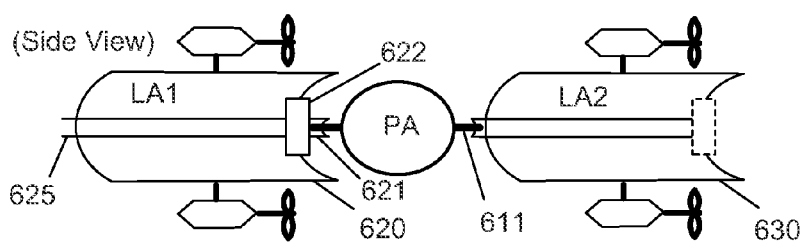

A third approach may be considered "break-before-make" in the sense of a mated connector providing for the transfer of electrical power, but still providing for continuous handling of a PA by the two LA's with no period of free flight by the PA. In one embodiment of this third approach, as illustrated in FIG. 6A, the PA 601 supports two grappling fixtures 610 and 611 at fixed antipodal locations on the PA. In this embodiment, each grappling fixture is associated with a mating connector (not shown). However, this association of a grappling fixture and a mating connector is not an inherent requirement of the inventive concept (the two could be separate). In the illustrated embodiment, each LA 620 and 630 supports a grappling appendage with end effector 621 and 631, respectively, that can grapple with either of the grappling fixtures 610 and 611 on the PA. In this embodiment, the grappling appendages with their end effectors 621 and 631 are at movable locations on rails 625 and 635 mounted on the LA 620 and 630, respectively. For discussion purposes, LA 620 will be considered to have "initial control" of the PA, and LA 630 will be considered the "new" LA that is intended to take over control of the PA. Prior to rendezvous, as illustrated in FIG. 6B, the PA 601 is mated to a mating fixture 622 of LA 620, at a rear longitudinal location of LA 620, with the grappling appendage and end effector 621 of LA 620 grappling the fixture 610 on PA 601, said grappling providing a docking of the PA with the LA 620. In order to transfer control of the PA to LA 630, the LA 630 positions its grappling appendage and end effector 631 at its bow and uses it to grapple the PA's grappling fixture 611 as illustrated in FIG. 6B and FIG. 6C. LA 620 then demates with the PA and releases the PA's grappling fixture 610. Once released, the LA 620 moves off (it may return to base for refueling and refurbishment). The movable grappling appendage on LA 630 then moves along the rail 635 until it is in position to mate the PA to its own mating fixture 632 at a rear longitudinal location.

For a system that employs "make-before-break" operations, as well as for a system that uses the third alternative described above and illustrated in FIG. 6, the PA does not require any accommodation for propulsion since it is always attached to an LA.

In the third alternative described above, with LA as illustrated in FIG. 6A with propulsion systems mounted top and bottom and the rail running horizontally (equatorially), the PA is mounted "backwards" every other handoff but remains "upright" throughout the handoff process and during tandem operations.

Buoyancy and Trim Control

The LA and PA may have slightly different buoyancy characteristics, and in any case the LA will tend to become more buoyant over time as it consumes its fuel supply. Buoyancy can be reduced by venting the lifting gas or compressing some of the lifting gas and storing it in a tank. If the lifting gas is hydrogen, it can also (or alternatively) be consumed in a fuel cell. This method can be used to marginally extend overall endurance. For example, since the inventive concept uses about 10 m$^3$ of lifting volume for every kg of gross vehicle weight (at the nominal altitudes discussed above), a kg of hydrogen fuel also requires about 10 m$^3$ of lifting volume (which is also assumed to be comprised of hydrogen, but at low density). If the density of air at 60,000 feet is approximately 0.2 kg/m$^3$, and assumed to be mostly nitrogen as opposed to hydrogen (atomic weights differ by 14:1), the density of hydrogen at altitude, at equivalent pressure, is about 0.014 kg/m$^3$. Ten cubic meters of lifting gas would have a mass of about 0.14 kg, and after burning a kg of fuel, this amount of lifting gas could either be compressed into the fuel tank, or also burned directly as fuel (thereby avoiding the weight burden of a compressor), in order to extend endurance by about 14% while maintaining constant buoyancy.

If the LA and PA are mated via a flexible cable, and are not identical in terms of buoyancy, the two will tend to float at slightly different altitudes with the cable in tension between the two. This is illustrated in FIG. 2. The more buoyant airship would tend to float at a higher altitude than the less buoyant airship, but the overall system will float at an altitude where the two together achieve neutral buoyancy.

If the LA and PA are mated end-to-end, in a rigid configuration, a difference in buoyancy may tend to cause the tandem combination to float in either a "nose up" or "nose down" attitude. This could increase drag and should therefore be avoided. Various methods can be employed to avoid improper attitude of the tandem combination including: a) lift surfaces on one or both airships that can be adjusted to provide a upward or downward force at a point that is far away from the center of mass of the tandem system (thereby providing a torque at the expense of some additional aerodynamic drag); b) venting or compressing lifting gas in the more buoyant airship to reduce its buoyancy; c) releasing lifting gas from a storage tank into a lifting cell (ballonet) in the less buoyant airship, to increase its buoyancy; d) exchanging low-pressure lifting gas between the two airships via the mating fixture between the two, so as to equalize their buoyancies; e) burning lifting gas in the more buoyant airship, as fuel, to reduce its buoyancy and extend its fuel supply; f) shifting lifting gas between ballonets in a single airship, so as to provide a variation in lift distribution; or g) mounting some or all of the power generation and fuel storage subsystems (or other heavy subsystems) on internal rails so that they can be moved fore and aft in order to adjust the weight distribution of the airship. Of course, some or all of these techniques can be used jointly.

With regard to option d) noted above, the exchange of low-pressure lifting gas between the two airships, it is anticipated that flow rates would be relatively low under average conditions since each kg of fuel consumed in the LA would require less than 0.14 kg of hydrogen to be exchanged in order to maintain equibuoyancy between the two airships (the 0.14 kg of "excess lifting gas" must be shared between the airships in proportion to their current GVW). Valves can be light-weight because the pressures are low. Instead of traditional pumps, some or all of the ballonets in one or both airships could be equipped with variable surface tension systems (for example cables surrounding a ballonet that can be tightened to increase internal pressure and thereby drive gas out of the ballonet, or loosened to accept the gas). Furthermore, the exchange of lifting gas from an LA to a PA would counter slow leakage of lifting gas from the PA. This would minimize or eliminate the need for "stored lifting gas" on the PA, and possibly allow the PA hull and ballonets to be designed with lighter-weight materials. However, the exchange of gas via the mating fixture adds additional complexity, weight, and need for fail-safe and backup systems. Also, under peak wind conditions, LA1 at least consumes fuel at a significant rate (on the order of 30 kg/hr for the exemplary airship designs of Table 3), and this might increase the weight of subsystems intended to provide for exchange of lifting gas. Hence, one embodiment of the present invention provides for both an exchange of lifting gas between the LA and PA, and also consumption of lifting gas on the LA as an auxiliary source of fuel.

Figure 7:
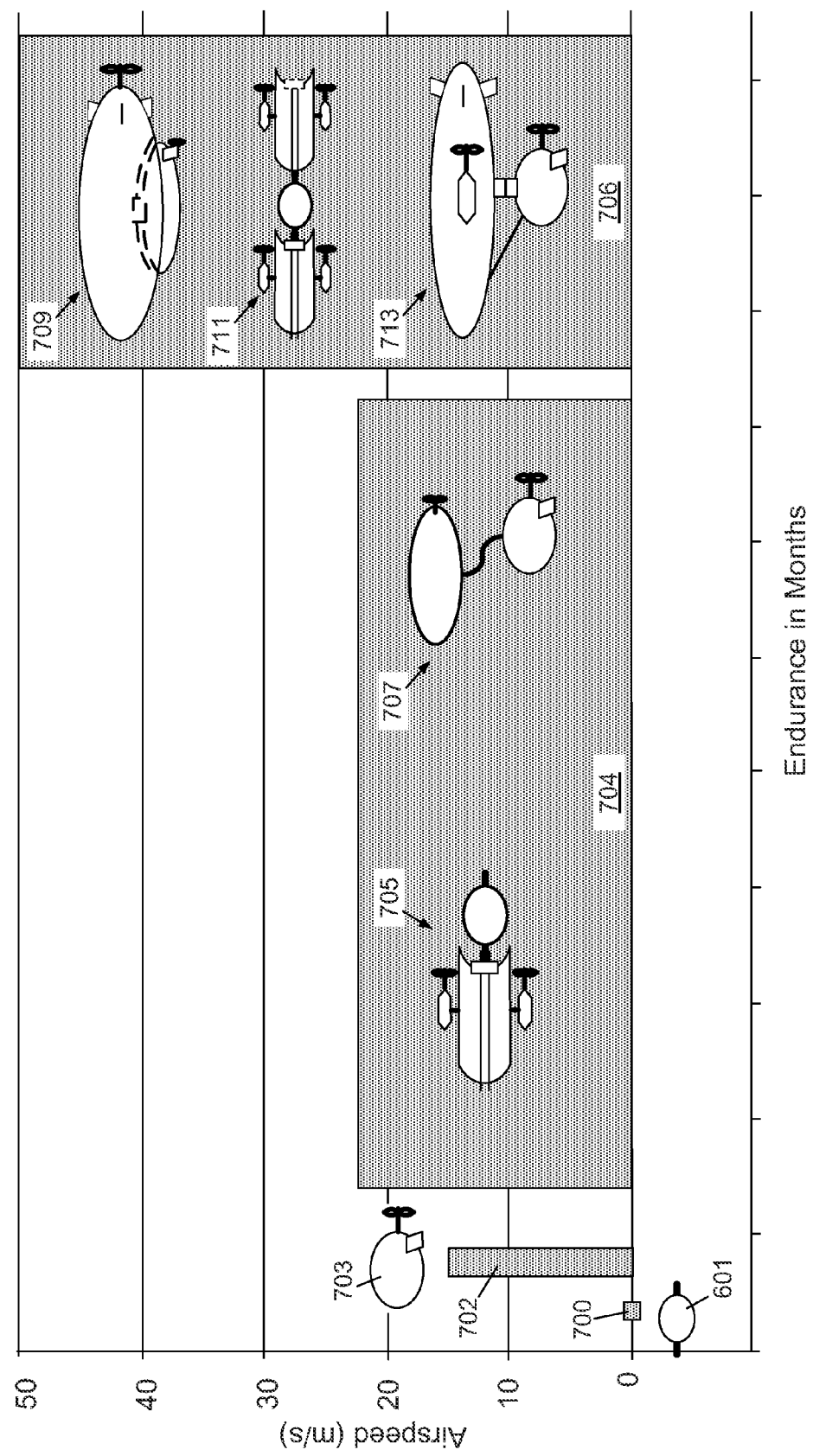
FIG. 7 is a graph showing capabilities of various airships and airship systems, according to one example of principles described herein.

FIG. 7 is a graph which shows illustrative operational envelopes for various airship configurations. The operational envelopes are given only as examples which illustrate qualitative differences between the airship configurations which provide modularity, operational flexibility, and cost savings. The airspeed in meters per second is shown on the vertical axis of the graph. Airship endurance in months is shown along the horizontal axis of the graph. The operation envelopes are shown as shaded boxes which describe the maximum airspeed and endurance of a given airship configuration. Illustrations of the various airship configurations are shown in conjunction with the operational envelopes. In this figure, the illustrative operational envelopes describe the maximum airspeed attainable with a given airship configuration. For station keeping, the operational envelopes define maximum wind velocity at which the airship can maintain position. The illustrative airships may not be able to maintain the maximum airspeed for the entire endurance period.

A first payload airship 601 is shown with its operational envelope 700. As discussed above, this payload airship 601 does not have a propulsion system. Instead it is designed to support the weight of the payload and may or may not have the ability to supply electrical power to the payload for short periods of time. This payload airship 601 is always attached to a logistics airship which provides propulsion and attitude control. Consequently, its operational envelope 700 is shown schematically as a small box. The "make-before-break" mating procedure for this payload airship 601 is shown in FIGS. 6A-6C.

A second payload airship 703 has its own power generation and propulsion capability. Its operational envelope 702 shows that it has a maximum airspeed of about 15 meters per second and an endurance of about 7 to 10 days. This payload airship 703 can maintain its heading and station keeping unassisted for short periods of time when wind speeds are below its maximum airspeed. This capability can facilitate undocking and docking procedures for logistic airships which support the payload ship.

A long endurance operation envelope 704 provides for approximately 7 months of station keeping at wind speeds of less than about 23 meters per second. This maximum airspeed represents a predetermined threshold below which the combined airships can maintain stationkeeping. At wind speeds higher than the predetermined threshold, the combined airships 705, 707 will not be able to generate enough thrust to maintain stationkeeping. The operational envelope 704 is only an example. Various combined airship designs may have different operational envelopes. For example, some combined airship designs may have endurances of 13 months or longer.

Two combined airships 705, 707 are shown as illustrative examples of airships that may have long endurance at moderate wind levels. In some embodiments, the combined airships may have at least an order of magnitude greater endurance than the payload airship alone. A first combined airship 705 includes a logistics airship with a payload airship connected to the rear of the logistics airship. The logistics airship provides electrical power, propulsion and control for the combined airship. As discussed above, this allows the payload airship to be relatively small, simple, and inexpensive. The logistics airship can be replaced or augmented by an additional logistics airship when meteorological conditions or fuel reserves dictate.

A second combined airship 707 also includes a payload airship with a mated logistics airship. In this configuration, the payload airship may have the propulsion capability to meet the maximum airspeed, but lack the fuel capacity and/or power generation capabilities for sustained stationkeeping. The logistics airship supplies electrical power or fuel to the payload airship through the mated umbilical cord. This allows the tandem combination to maintain stationkeeping over the endurance period. This configuration is illustrated and described with respect to FIG. 3.

A third operational envelope 706 provides shorter endurance, but at higher peak airspeeds. As discussed above, for many long duration missions the wind velocities are relatively benign for long periods. However, for shorter periods, the wind speeds may increase substantially. Typically, these periods with higher wind speeds can be accurately forecasted and the airship configuration modified to maintain station keeping. In the operational envelope 706 has a maximum airspeed of 50 meters per second and duration of several months.

Three illustrative combined airship configurations 709, 711, 713 are shown within the third operation envelope 706. The upper combined airship 709 includes a logistics airship with a nadir cavity and a hard dock which receives the payload airship. As discussed above, this is a configuration with reduced aerodynamic drag as compared to a tandem airship that relies on external carriage, or a flexible umbilical. The larger logistics airship may provide electrical power, fuel and thrust to the payload airship. This allows the combined airship 709 to maintain stationkeeping during the periods of higher wind speeds.

The middle combined airship 711 is similar to the example shown in FIG. 6C. The two logistics airships are attached to the payload airship and the combined propulsion of the two logistics airships provides the required stationkeeping propulsion during periods of higher wind speeds. As discussed above, the airship configurations can be altered to meet the needs of the mission and the environmental conditions. During periods of moderate wind, the combined airship 705 may be used. When higher wind speeds are forecast, an additional logistics airship can be attached to the payload to form a combined airship 711 with higher propulsion power. After the period of high wind speed is over, one of the logistics airships can be detached and return to a base station for refueling. The other configurations can be similarly modified to meet changing conditions.

The bottom combined airship 713 has a soft dock between the payload airship and a large logistics airship. A cable system provides a structural linkage between the payload airship and the logistics airship, and strain relief for the mating fixture. This allows the logistics airship to use its propulsion system to provide thrust for the tandem combination.

The combined airships 709, 711, 713 in the third operational envelope 706 are configured for stationkeeping at a predetermined station in meteorological conditions with wind speeds above the predetermined threshold associated with the operational envelope 704. According to one illustrative embodiment, the long endurance combined airships 705, 707 may have at least twice the endurance of the higher speed airships 709, 711, 713, by virtue of trading power generation and propulsion system mass for fuel and tankage mass. However, the higher speed airships 709, 711, 713 are configured to generate at least two times the thrust of the long endurance combined airships 705, 707.

Figure 8:
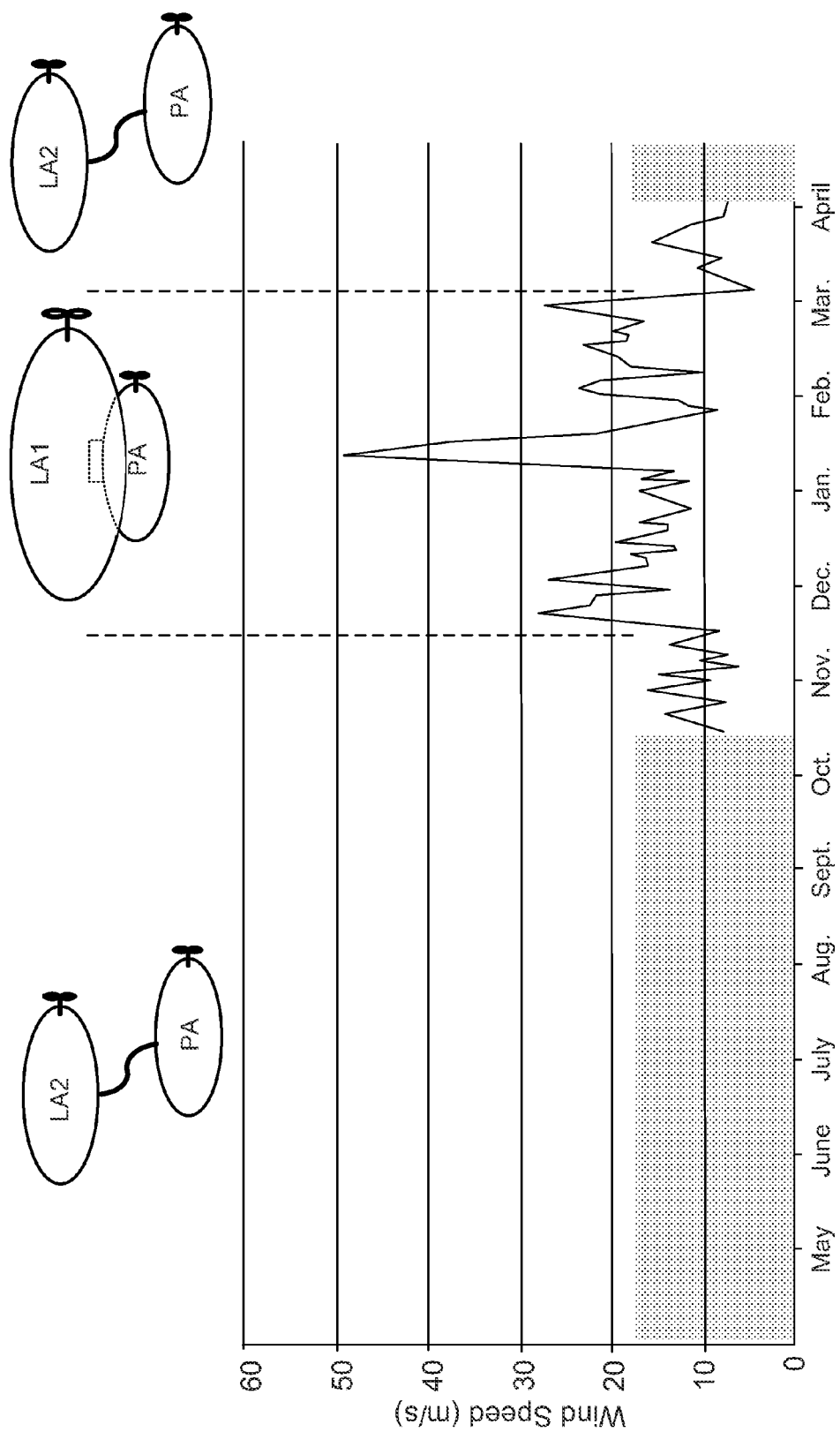
FIG. 8 is a graph of wind speeds over a one year long endurance mission, according to one example of principles described herein.

FIG. 8 is a graph which shows illustrative airship configurations during a one year period in a long endurance mission. The vertical axis of the graph shows wind speed and the horizontal axis of the graph shows months during the mission. The wind speed data shown in the graph is actual wind speed data taken at the operational altitude in the lower stratosphere at a predetermined station [Modica, 2007]. From May through October, the wind speeds were generally benign and did not exceed 20 meters per second. This benign period is represented by the left shaded box. However, from mid-November through the first week in March, the wind speeds increased significantly. These higher wind speeds are shown by the solid line on the graph. The solid line represents the maximum wind speed during a given time period and represents the upper bound of the wind speed. The average wind speed during this period may be significantly lower than shown by the solid line. The shaded box to the right of the solid line represents a following period of relatively benign winds.

In this example, the payload aircraft (PA) has a propulsion system and carries a relatively small amount of fuel. The small logistic airship (LA2) carries sufficient fuel and provides enough thrust for the combined airship to maintain stationkeeping from May to October. As shown by the graph, the maximum wind speed from May to October for this particular mission was less than 20 meters per second. Consequently, to maintain the combined airship (LA2, PA) on station, the combined airship needs only to have a maximum airspeed capability of 20 meters per second.

To successfully maintain stationkeeping during the higher wind speed period, the combined airship has been reconfigured to replace the small logistics airship LA2 with the larger logistics airship LA1. As shown in the graph, the maximum wind speed from November to March was generally less than 30 m/s, but exhibited a peak of nearly 50 meters per second in January. The peak lasted for about a week. To meet this requirement, the larger logistics airship LA1 has a higher thrust capacity than the smaller logistics airship LA2. Further, to reduce aerodynamic drag the payload airship is anchored in a cavity in the bottom of the larger logistics airship. This allows the combined airship to move more efficiently. Additionally, the mating between the airships secures the payload airship to the larger logistics airship so that thrust and other forces can be transferred from the logistics airship to the payload airship.

After the high wind period is over, the larger logistics airship LA1 is undocked from the payload airship PA and the smaller logistics airship LA2 again docks with the payload airship PA.

Figure 9A:
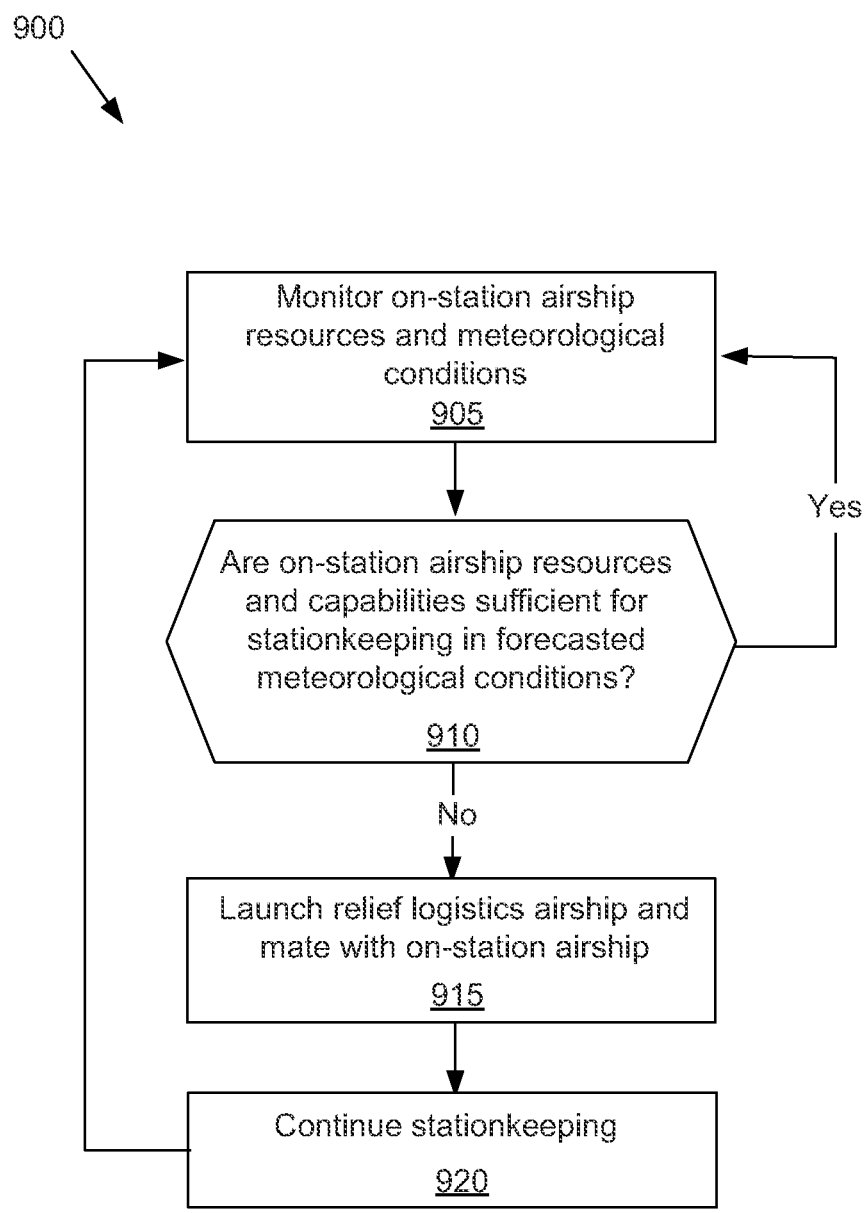
FIGS. 9A and 9B are flowcharts of illustrative methods for maintaining long endurance airship operations, according to one example of principles described herein.

FIG. 9A is a flow chart of an illustrative method 900 for maintaining long endurance airship operations. After the airship or combined airship is on-station at the desired altitude and location, the on-station airship resources, capabilities, and meteorological conditions are monitored (block 905). Based on this monitored information, the situation is evaluated on an ongoing basis to determine if the on-station airship resources and capabilities are sufficient for station keeping in the forecasted meteorological conditions (block 910). If the on-station airship resources and capabilities are sufficient, no relief logistics airship is launched and monitored information continues to be evaluated. However, if the on-station airship resources or capabilities are not sufficient for station keeping in the predicted meteorological conditions, a relief logistics airship can be launched and mated with the on-station airship (block 915). For example, if the on-station airship is a combined airship that includes a payload airship and a logistics airship, the fuel supply or propulsion capability of the logistics airship may not be sufficient to meet the anticipated meteorological conditions. A relief logistics airship can be launched carrying the desired fuel and having the desired propulsion capabilities. The relief logistics airship docks to either the payload airship or the logistics airship. For example, as shown in FIG. 6C, two logistics airships simultaneously support the payload airship. In other examples, the payload airship may be transferred from the current logistics airship to the relief logistics airship as described with respect to FIG. 3. The stationkeeping continues to be maintained using the reconfigured airship (block 920).

Figure 9B:
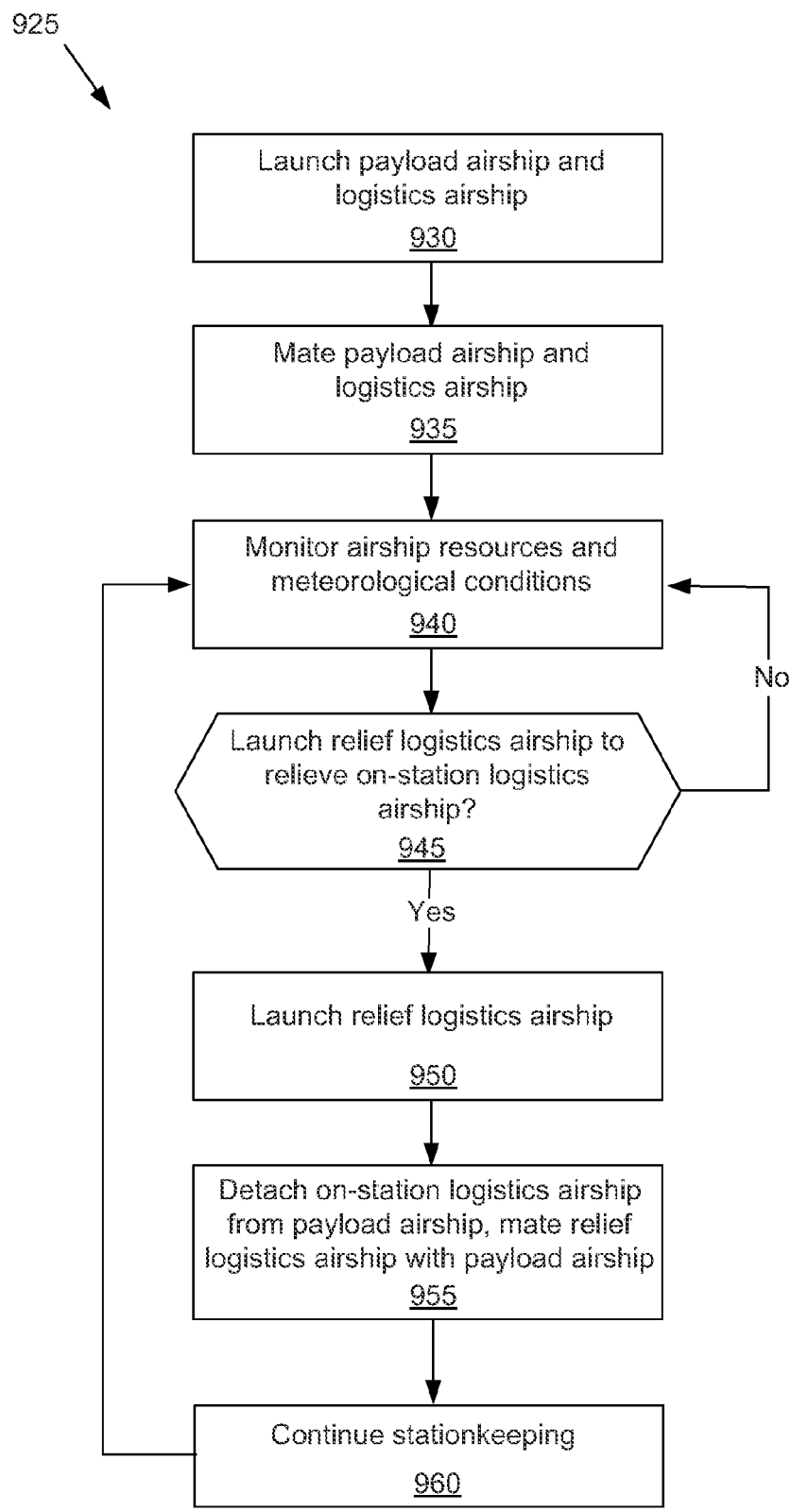

FIG. 9B is a flowchart 925 which describes an illustrative long endurance mission by a break-before-mate airship system. The payload airship and logistics airship are launched (block 930). The payload airship and logistics airship will typically be launched separately but can be launched in a mated configuration. The payload airship has sufficient fuel and propulsion capability to at least maintain its heading and for maneuvering. The logistics airship has the fuel and propulsion capabilities to maintain stationkeeping of the combined airship for an extended period of time. The logistics airship and payload airship may be mated prior to launch, after the launch but before reaching the station, or after both airships have reached the desired station (block 935). The meteorological conditions and the resources and capabilities of the combined airship are monitored (block 940). If the resources and capabilities of the combined airship are anticipated to be sufficient to meet the forecasted meteorological conditions, the relief airship is not launched and the monitoring continues (block 945). If the resources and capabilities of the combined airship are not anticipated to be sufficient to meet the forecasted meteorological conditions, the relief airship is launched (block 950). For example, if on-station wind speeds are forecast to exceed the propulsion capability of the combined airship, a relief logistics airship with greater propulsion capabilities may be launched. The on-station logistics airship is detached from the payload airship and the relief logistics airship is mated with the payload airship (block 955). Stationkeeping continues (block 960) and the monitoring of the airship and meteorological conditions is maintained.

It should be noted that, in an operational system where multiple payload airships are served by a pool of logistics airships (thereby minimizing sparing), there may be an economic benefit to early replenishment/replacement of a logistics airship in order to minimize the total number of logistics airships required by the system as a whole.

In conclusion, a reconfigurable combined airship provides cost and operational advantages during long endurance missions. The payload airship is relatively small and low-cost and is supported by logistic airships as needed to maintain stationkeeping over the duration of the mission. This can also reduce risks to the payload because the payload airship stays aloft indefinitely and avoids the relatively risky activities of low-altitude operation, launch and recovery. The logistics airships do not carry a payload (in the baseline concept) and can be designed for optimum mission duration and cost-effectiveness.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An airship system comprising:
  a first combined airship comprising a payload airship and a first logistics airship, the first combined airship being configured for stationkeeping at a predetermined station during meteorological conditions with wind speeds below a predetermined threshold; and
  a second combined airship comprising the payload airship and a second logistics airship, the second combined airship being configured for stationkeeping at the predetermined station in meteorological conditions with wind speeds above the predetermined threshold;
  wherein the airship system is adapted to maintain the payload airship at a desired position for a period of at least one month; and
  wherein said second logistics airship is adapted to mate in flight with at least one of the first logistics airship or the payload airship.

2. The system of claim 1, in which the payload airship is configured to be reversibly mated to at least one of the first logistics airship and the second logistics airship.

3. The system of claim 1, in which the first combined airship comprises a soft mate between the payload airship and the first logistics airship, the soft mate transferring electrical power from the first logistics airship to the payload airship.

4. The system of claim 1, in which the payload airship has propulsion capability sufficient to maintain a heading of the payload airship, the payload airship being configured to demate from the first logistics airship prior to mating with the second logistics airship.

5. The system of claim 1, in which a mate between the payload airship and the second logistics airship is a hard mate configured to transfer structural loads between the payload airship and the second logistics airship.

6. The system of claim 1, in which the first combined airship has at least twice the endurance of the payload airship alone.

7. The system of claim 1, in which the second combined airship is configured to generate at least two times more thrust than the first combined airship.

8. The system of claim 1, in which the first combined airship has at least two times longer endurance than the second combined airship.

9. The system of claim 1, in which the first combined airship and the second combined airship are configured to maintain stationkeeping without propulsion from the payload airship.

10. A combined airship comprising two airships reversibly mated together, said airships configured to support rendezvous, mating, and demating, while in flight, wherein the two airships have design capabilities differing by at least a factor of two with regard to at least one of: power generation capability, propulsion capability, endurance capability, and lift capability.

11. The combined airship of claim 10, in which a first airship is designed for stationkeeping in high winds and can provide electrical power to a second airship, and wherein said second airship can receive electrical power from said first airship.

12. The combined airship of claim 10, in which a first airship is capable of providing stationkeeping at a station without propulsion from a second airship.

* * * * *